US008760367B2

(12) United States Patent
Yoshino

(10) Patent No.: US 8,760,367 B2
(45) Date of Patent: Jun. 24, 2014

(54) DISPLAY DEVICE AND RECORDING MEDIUM

(75) Inventor: Ken Yoshino, Koganei (JP)

(73) Assignee: NEC Corporation, Tokyo (JP)

( * ) Notice: Subject to any disclaimer, the term of this patent is extended or adjusted under 35 U.S.C. 154(b) by 590 days.

(21) Appl. No.: 12/710,241

(22) Filed: Feb. 22, 2010

(65) Prior Publication Data

US 2010/0245369 A1    Sep. 30, 2010

(30) Foreign Application Priority Data

Mar. 31, 2009    (JP) ................... 2009-088369

(51) Int. Cl.
G09G 5/00    (2006.01)
G09G 3/30    (2006.01)
G06T 1/00    (2006.01)

(52) U.S. Cl.
USPC .................. 345/4; 345/76; 345/522

(58) Field of Classification Search
USPC ........................................ 345/522
See application file for complete search history.

(56) References Cited

U.S. PATENT DOCUMENTS

| | | | | |
|---|---|---|---|---|
| 5,640,171 A * | 6/1997 | Shimada | ................ | 345/8 |
| 2006/0152433 A1* | 7/2006 | Chang | ................ | 345/1.1 |
| 2007/0085759 A1* | 4/2007 | Lee et al. | ................ | 345/1.1 |
| 2007/0146233 A1* | 6/2007 | Lee et al. | ................ | 345/6 |
| 2007/0164923 A1* | 7/2007 | Kanai et al. | ................ | 345/1.1 |
| 2007/0182730 A1* | 8/2007 | Mashitani et al. | ............ | 345/419 |
| 2009/0011751 A1 | 1/2009 | Goto | | |
| 2009/0221335 A1* | 9/2009 | Nakazawa | ................ | 455/575.4 |
| 2010/0110010 A1* | 5/2010 | Choi | ................ | 345/169 |

FOREIGN PATENT DOCUMENTS

| JP | 62-291293 | 12/1987 |
|---|---|---|
| JP | 06-258597 | 9/1994 |
| JP | 09-037193 | 2/1997 |
| JP | 09-159970 | 6/1997 |
| JP | 2857429 | 11/1998 |
| JP | 10-333091 | 12/1998 |
| JP | 11-249593 | 9/1999 |
| JP | 4163355 | 6/2001 |
| JP | 2001-223963 | 8/2001 |

(Continued)

OTHER PUBLICATIONS

Webster's New World Dictionary, 1995, Simon & Schuster, Inc., First Pocket Books Edition, p. 174.*

Primary Examiner — Alexander S Beck
Assistant Examiner — Mihir Rayan
(74) Attorney, Agent, or Firm — Cozen O'Connor

(57) ABSTRACT

The mobile communication terminal comprises a first casing and a second casing carrying a first display part and a second display part, respectively. The first display part and the second display part are each capable of 3D display. The controller of the mobile communication terminal detects the mobile communication terminal being opened vertically or horizontally and detects the opening angle between the first casing and the second casing. In the 3D display in the horizontal opened state, the visibility of the 3D display is altered as the opening angle is changed. Therefore, the controller of the mobile communication terminal calculates the viewing angle according to the detected opening angle and changes the parameters for the 3D display, whereby excellent visibility is maintained even if the opening angle is changed.

20 Claims, 16 Drawing Sheets

(56) References Cited

FOREIGN PATENT DOCUMENTS

| | | |
|---|---|---|
| JP | 2005-099787 | 4/2005 |
| JP | 2005-157332 | 6/2005 |
| JP | 2006-201517 | 8/2006 |
| JP | 2007-020839 | 2/2007 |
| JP | 2008-003574 | 1/2008 |
| JP | 2008-170841 | 7/2008 |
| JP | 2009-011493 | 1/2009 |

* cited by examiner

HORIZONTALLY OPENED STATE

VERTICALLY OPENED STATE

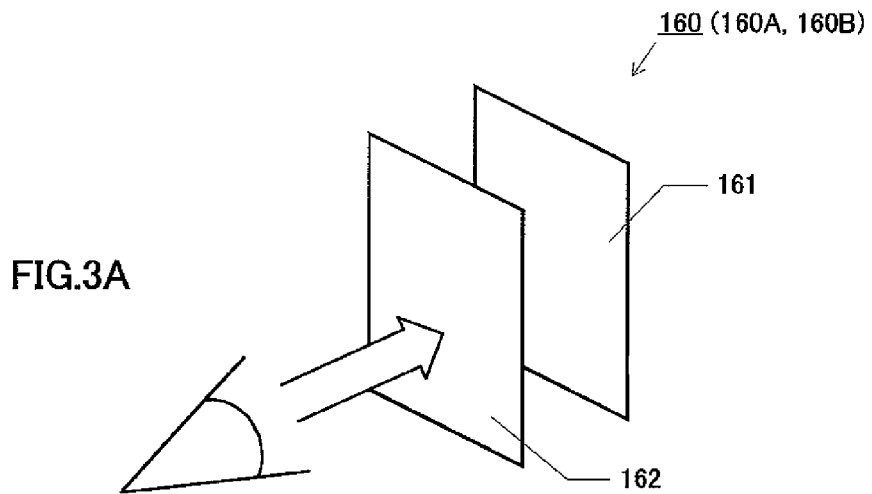
FIG.3A
LEFT-EYE IMAGE
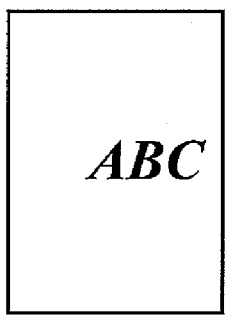
FIG.3B
RIGHT-EYE IMAGE
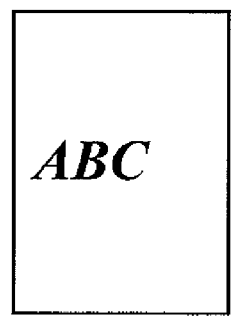
FIG.3C
FIG.3D

FIG.6

PARAMETER TABLE

| CONDITION PARAMETERS | | | | CONTROL PARAMETERS | | |
|---|---|---|---|---|---|---|
| INTEROCULAR DISTANCE | VIEWING DISTANCE | OPENING ANGLE | VIEWING ANGLE | DISPLAY PANEL | BARRIER PATTERN | |
| ⋮ | ⋮ | ⋮ | ⋮ | ⋮ | ⋮ | |
| *5.0cm* | *40cm* | 20° | α5 | [LINE CONTROL VALUE] | [LINE CONTROL VALUE] | ⋯ |
| | 45cm | | α6 | [LINE CONTROL VALUE] | [LINE CONTROL VALUE] | |
| | ⋮ | | ⋮ | ⋮ | ⋮ | |
| | ⋮ | | ⋮ | | | |
| 5.5cm | 40cm | | α17 | [LINE CONTROL VALUE] | [LINE CONTROL VALUE] | |
| | 45cm | | α18 | [LINE CONTROL VALUE] | [LINE CONTROL VALUE] | |
| ⋮ | ⋮ | ⋮ | ⋮ | ⋮ | ⋮ | |
| *5.0cm* | *40cm* | 90° | α29 | [LINE CONTROL VALUE] | [LINE CONTROL VALUE] | ⋯ |
| | 45cm | | α30 | [LINE CONTROL VALUE] | [LINE CONTROL VALUE] | |
| | ⋮ | | ⋮ | ⋮ | ⋮ | |
| 5.5cm | 40cm | | α41 | [LINE CONTROL VALUE] | [LINE CONTROL VALUE] | |
| | 45cm | | α42 | [LINE CONTROL VALUE] | [LINE CONTROL VALUE] | |
| ⋮ | ⋮ | ⋮ | ⋮ | ⋮ | ⋮ | |
| *5.0cm* | *40cm* | 180° | α53 | [LINE CONTROL VALUE] | [LINE CONTROL VALUE] | ⋯ |
| | 45cm | | α54 | [LINE CONTROL VALUE] | [LINE CONTROL VALUE] | |
| | ⋮ | | ⋮ | ⋮ | ⋮ | |
| 5.5cm | 40cm | | α65 | [LINE CONTROL VALUE] | [LINE CONTROL VALUE] | |
| | 45cm | | α66 | [LINE CONTROL VALUE] | [LINE CONTROL VALUE] | |
| ⋮ | ⋮ | ⋮ | ⋮ | ⋮ | ⋮ | |
| | | ⋮ | | | | |

 DEFAULT VALUE (PREVIOUSLY USED VALUE)

FIG.8
OPERATION SETTING TABLE
| DISPLAY MODE | 3D | 2D |
|---|---|---|
| DISPLAY IN THE CLOSED STATE | YES(2D) | NO |
| DISPLAY DURING THE VERTICAL/HORIZONTAL SWITCHING | 2D | NO |
| DISPLAY DURING THE COUPLING STATE CHANGE | YES <br> 3D \| 2D | NO |
| ⋮ | ⋮ | ⋮ |
 ENABLED      DISABLED

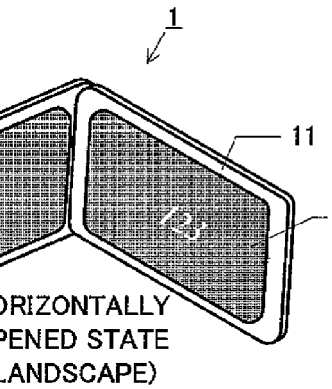
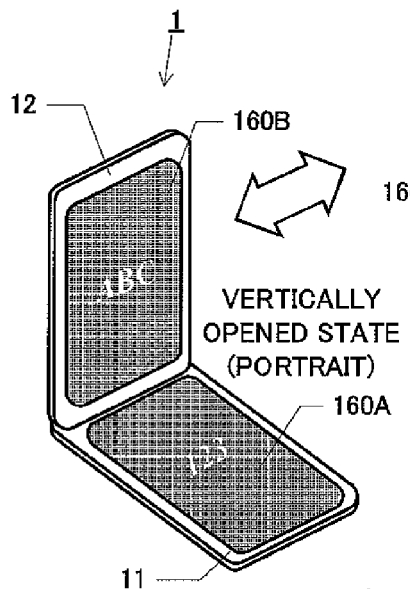
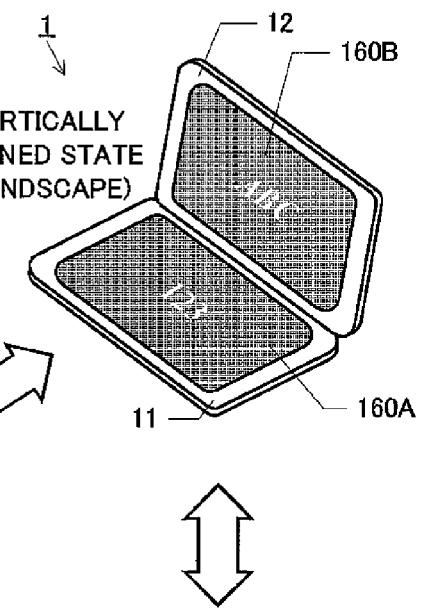
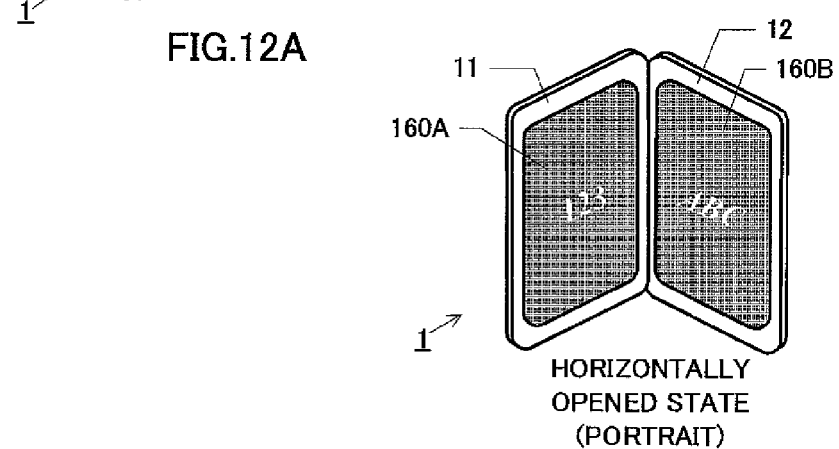

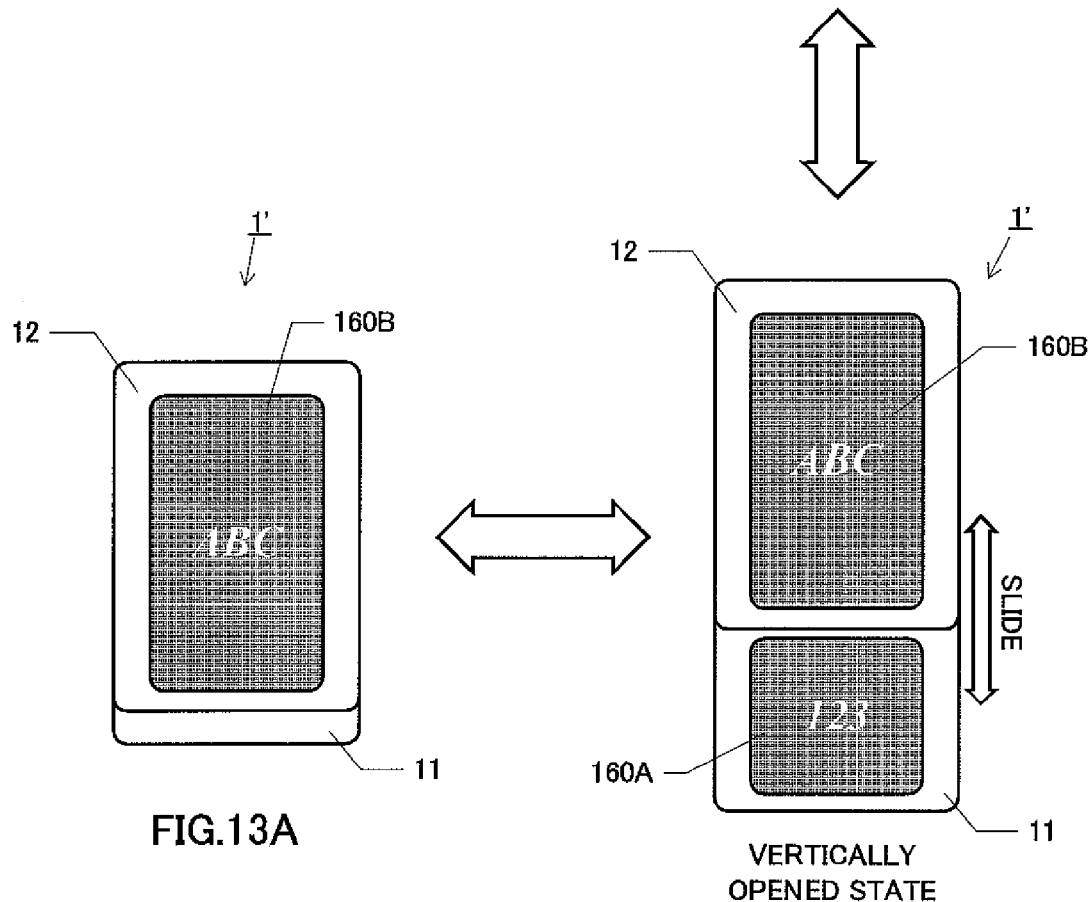

SLIDE DISTANCE CHANGE (+ΔL)

VIEWING ANGLE ≈ ±α = $\tan^{-1}(L/2d)$ → VIEWING ANGLE ≈ ±α' = $\tan^{-1}((L+\Delta L)/2d)$ VIEWING ANGLE CHANGE Δα
≈ $\tan^{-1}((L+\Delta L)/2d) - \tan^{-1}(L/2d)$

DISPLAY DEVICE AND RECORDING MEDIUM

CROSS-REFERENCE TO RELATED APPLICATION

This application claims the benefit of Japanese Patent Application No. 2009-88369, filed on Mar. 31, 2009, the entire disclosure of which is incorporated by reference herein.

FIELD

This application relates generally to a display device and recording medium, and more particularly, to a display device and recording medium preferably used for three-dimensional image display using two or more screens.

BACKGROUND

Many mobile communication terminals such as cellphones generally are of a folding type or of a sliding type comprising multiple movable casings for portability and operability.

The display units used in mobile communication terminals are dominantly composed of liquid crystal display panels. Some of such display units have the touch panel function, namely, numeric keypads and other buttons used for input operation are realized as software keys.

Presumably, the physical buttons can be replaced with software keys in the folding or sliding type devices. In such a case, more diverse display modes can be realized by coupling two or more display screens.

Furthermore, three-dimensional image display techniques utilizing liquid crystal display technique have been established (for example, the Japanese Patent No. 2857429). In such three-dimensional image display techniques, the viewing position (head position) of the user is detected and the three-dimensional images are so formed as to trace the viewing position for maintaining excellent three-dimensional display (for example, Unexamined Japanese Patent Application KOKAI Publication No. H10-333091).

Compared with the prior art one-screen three-dimensional display, more diverse effects can be realized by applying the three-dimensional display technique to two or more coupled display screens.

A drawback of three-dimensional images is that they are difficult to view unless the display is controlled in accordance with the viewing conditions (such as the viewing distance and angle and the interocular distance of the viewer). In a folding or sliding type device, the viewing condition is altered when the coupling state between the two screens is changed, leading to failure to maintain an excellent three-dimensional display.

The technique described in the Unexamined Japanese Patent Application KOKAI Publication No. H10-333091 can be used in order to eliminate the above inconvenience. However, a position-detecting sensor is necessary for detecting the viewing position (the head position) and allowing the three-dimensional image to trace it and the parameters for the tracing become multifaceted. Therefore, the hardware configuration and software processing becomes complex. It is difficult to apply such a technique to a small device such as a mobile communication terminal. Furthermore, additional complex processing is required in applying such a technique to two or more coupled display screens; such application is much more difficult.

SUMMARY

The present invention is made in view of the above circumstances and provides a display device preferably used for three-dimensional image display using two or more screens and a recording medium.

The display device according to the first aspect of the present invention is a display device including: a first casing having a first display screen; and a second casing movably coupled to the first casing and having a second display screen, wherein the display device comprises: a display unit providing three-dimensional image display on both of the first display screen and the second display screen; a coupling state detection unit detecting the coupling state between the first casing and the second casing; a viewing angle calculation unit calculating the viewing angle to the three-dimensional image display by the display unit based on the coupling state detected by the coupling state detection unit; and a display control unit selecting parameters used by the display unit for providing the three-dimensional image display based on the coupling state detected by the coupling state detection unit and the viewing angle calculated by the viewing angle calculation unit.

The display device according to the second aspect of the present invention is a display device including: a first casing having a first display screen; and a second casing movably coupled to the first casing and having a second display screen, wherein the display device comprises: a display unit providing three-dimensional image display on both of the first display screen and the second display screen; a coupling state detection unit detecting the coupling state between the first casing and the second casing; and a display control unit providing the three-dimensional image display on the first display screen and the second display screen with different projection distances based on the coupling state detected by the coupling state detection unit.

The recording medium according to the third aspect of the present invention is a recording medium records a program that allows a computer controlling a display device including: a first casing having a first display screen; and a second casing movably coupled to the first casing and having a second display screen to realize the following functions: providing three-dimensional image display on both of the first display screen and the second display screen; detecting the coupling state between the first casing and the second casing; calculating the viewing angle to the three-dimensional image display based on the detected coupling state; and selecting the parameters used for providing the three-dimensional image display based on the detected coupling state and calculated viewing angle.

The recording medium according to the fourth aspect of the present invention is a recording medium records a program that allows a computer controlling a display device including: a first casing having a first display screen; and a second casing movably coupled to the first casing and having a second display screen to realize the following functions: providing three-dimensional image display on both of the first display screen and the second display screen; detecting the coupling state between the first casing and the second casing; and providing the three-dimensional image display on the first display screen and the second display screen with different projection distances based on the detected coupling state.

The present invention provides a display device preferably used for providing three-dimensional image display using two or more screens.

BRIEF DESCRIPTION OF THE DRAWINGS

A more complete understanding of this application can be obtained when the following detailed description is considered in conjunction with the following drawings, in which:

FIG. 3A is a schematic illustration of the display part for explaining the structure of the display part shown in FIG. 2;

FIG. 3B is an illustration showing a left-eye image displayed on the display part for explaining the structure of the display part shown in FIG. 2;

FIG. 3C is an illustration showing a right-eye images displayed on the display part for explaining the structure of the display part shown in FIG. 2;

FIG. 3D is an illustration showing an array of pixels of a three-dimensional image for explaining the structure of the display part shown in FIG. 2;

FIG. 6 is an illustration showing a "parameter table" stored in the storing part shown in FIG. 2;

FIG. 8 is an illustration showing a "operation setting table" stored in the storing part shown in FIG. 2;

FIG. 12A is an illustration showing another folding type mobile communication terminal according to Embodiment 1 of the present invention in the closed state;

FIG. 12B is an illustration showing another folding type mobile communication terminal according to Embodiment 1 of the present invention in the vertically opened state in the portrait orientation;

FIG. 12C is an illustration showing another folding type mobile communication terminal according to Embodiment 1 of the present invention in the horizontally opened state in the landscape orientation;

FIG. 12D is an illustration showing another folding type mobile communication terminal according to Embodiment 1 of the present invention in the vertically opened state in the landscape orientation;

FIG. 12E is an illustration showing another folding type mobile communication terminal according to Embodiment 1 of the present invention in the horizontally opened state in the portrait orientation;

FIG. 13A is an illustration showing the sliding type mobile communication terminal according to Embodiment 1 of the present invention in the closed state;

FIG. 13B is an illustration showing the sliding type mobile communication terminal according to Embodiment 1 of the present invention in the vertically opened state;

FIG. 13C is an illustration showing a sliding type mobile communication terminal according to Embodiment 1 of the present invention in the horizontally opened state;

DETAILED DESCRIPTION

Embodiments of the present invention are described hereafter with reference to the drawings.

(Embodiment 1)

In this embodiment, the display device of the present invention is realized as a mobile communication terminal such as a cell-phone. In this embodiment, a so-called "folding type" mobile communication terminal as shown in FIGS. 1A to 1C is assumed.

Figure 1C:
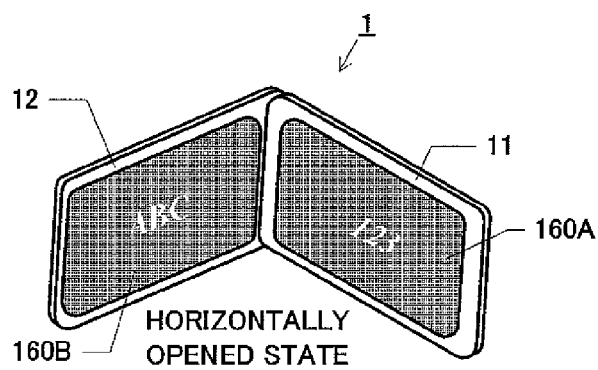
FIG. 1C is an illustration showing the folding type mobile communication terminal according to Embodiment 1 of the present invention in the horizontally opened state.
Figure 1B:
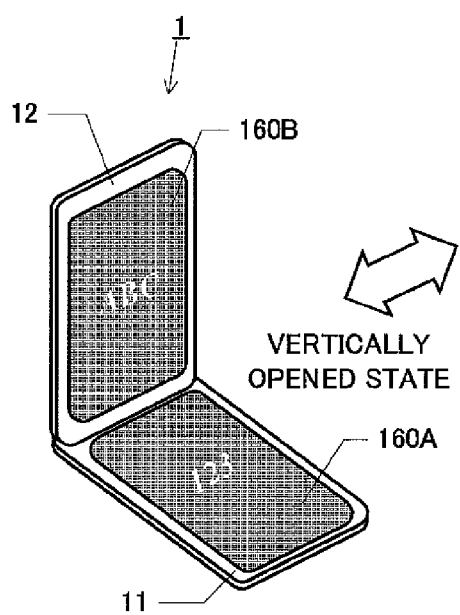
FIG. 1B is an illustration showing the folding type mobile communication terminal according to Embodiment 1 of the present invention in the vertically opened state.
Figure 1A:
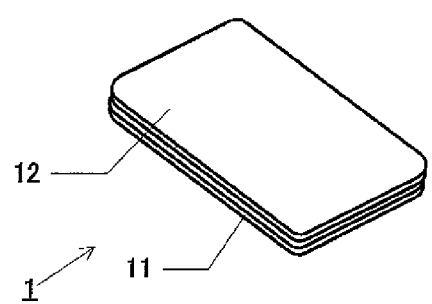
FIG. 1A is an illustration showing a folding type mobile communication terminal according to Embodiment 1 of the present invention in the closed state.

A mobile communication terminal 1 of this embodiment is comprised of a casing 11 and a casing 12 movably coupled by hinges as shown in FIGS. 1A to 1C. Here, FIG. 1A shows the folding type mobile communication terminal 1 in the closed state.

The mobile communication terminal 1 of this embodiment can be opened/closed in the longitudinal direction of the casings from the closed state shown in FIG. 1A. FIG. 1B shows the mobile communication terminal 1 in the vertically opened state about a shorter side of the nearly rectangular body as the rotation axis from the closed state shown in FIG. 1A. The casing 11 carries a first display part 160A and the casing 12 carries a second display part 160B as shown in FIG. 1B.

In this case, the vertically opened display parts 160A and 160B are both viewed in the portrait orientation. This is the general opening direction of the folding type mobile communication terminal. The mobile communication terminal 1 is used in this state for making telephone calls and creating/reading e-mail messages.

In FIGS. 1A to 1C, the characters "123" and "ABC" on the display parts 160A and 160B indicate the display direction on the screen. In the opened state shown in FIG. 1B, the display parts 160A and 160B are viewed one above the other in the view field of the user (this state is termed "the vertical opened state" hereafter).

FIG. 1C shows the mobile communication terminal 1 entirely rotated by 90 degrees either to the right or to the left from the vertically opened state shown in FIG. 1B. In other words, the horizontally opened display parts 160A and 160B are both viewed in the landscape orientation. This opening direction is used for example for watching photos, motion pictures, television programs, and so on. In this case, the display parts 160A and 160B are viewed side by side in the view field of the user (this state is termed "the horizontal opened state" hereafter).

As described above, the casings 11 and 12 of the mobile communication terminal 1 of this embodiment each carry a display part 160 (display part 160A or 160B). The display part 160B of the casing 12 is used for screen display similar to those of general mobile communication terminals. The display part 160A of the casing 11 has the touch pad function, providing the input function replacing the ten keypads of general mobile communication terminals. The display part 160A not only serves as the input unit but also provides screen display along with the display part 160B so that the two or more screen displays are available.

Figure 2:
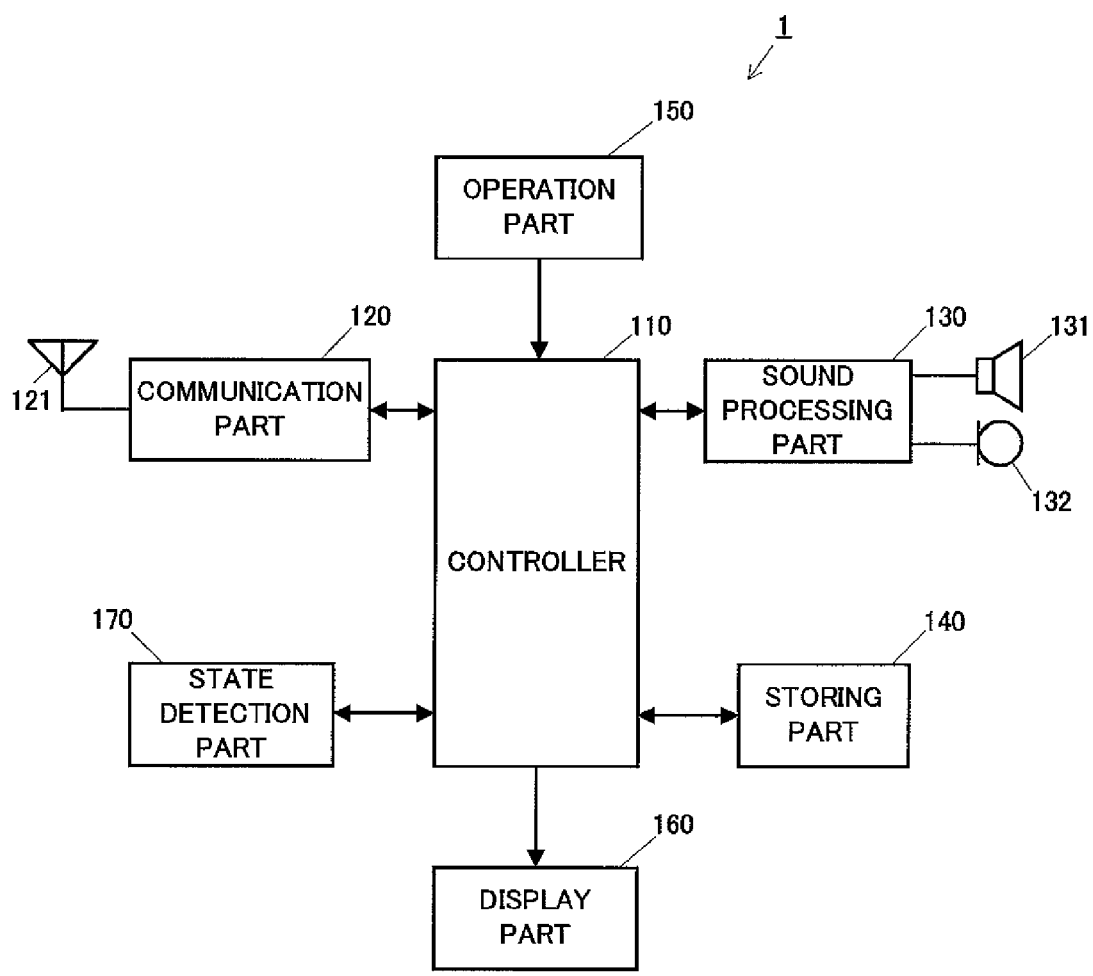
FIG. 2 is a block diagram showing the internal configuration of the mobile communication terminal shown in FIGS. 1A to 1C.

The internal configuration of the mobile communication terminal 1 having the above casing structure will be described hereafter with reference to FIG. 2. FIG. 2 is a block diagram showing the internal configuration of the mobile communication terminal 1.

As shown in the figure, the mobile communication terminal 1 comprises a controller 110, a communication part 120, a sound processing part 130, a storing part 140, an operation part 150, a display part 160 (the display parts 160A and 160B), and a state detection part 170.

The controller 110 is comprised of, for example, a CPU (central processing unit) and a RAM (random access memory) as a work area. Specific operation programs are executed to control the parts of the mobile communication terminal 1. More specifically, the components of the mobile communication terminal 1 are controlled by the controller 110 and information is transferred between the components via the controller 110.

The communication part 120 is provided for wireless access for communication of the mobile communication terminal 1 and is comprised of, for example, a communication unit using the CDMA (code division multiple access) or GSM (global systems for mobile communications) system. The communication part 120 performs wireless transmission/reception via an antenna 121 workable with the communication system so as to communicate with a nearby base station.

The sound processing part 130 is comprised of, for example, a voice data codec circuit so as to perform voice input/output processing of the mobile communication terminal 1. More specifically, the sound processing part 130 converts digital voice data received by the communication part 120 to analog voice signals and outputs them via a speaker 131 in receiving speeches and converts speech of the user that is entered through a microphone 132 to digital voice data and sends them to the communication part 120 in transmitting speeches.

The storing part 140 is comprised of, for example, a storage such as a flash memory and stores operation programs executed by the controller 110 and various data necessary for realizing the present invention.

The operation part 150 is comprised of, for example, buttons and keys provided on the exterior of the casing 11 and is operated by the user of the mobile communication terminal 1. Comprising an input circuit connected to the buttons and keys, the operation part 150 generates input signals according to the user operation and supplies them to the controller 110.

The display part 160 is a display unit comprising, for example, a liquid crystal display unit and displays images under the control of the controller 110. The display part 160 of this embodiment is a display unit capable of three-dimensional image display ("3D display" hereafter). The structure of such a 3D display-capable display part 160 will be described hereafter with reference to FIGS. 3A to 3D.

The display part 160 of this embodiment comprises a display panel 161 and a parallax barrier panel 162 as shown in FIG. 3A for realizing the 3D display.

The display panel 161 is comprised of a liquid crystal display panel and displays images.

The parallax barrier panel 162 has the same structure as the liquid crystal panel and controls the transmission direction of light generated by the image display on the display panel 161. For this reason, the parallax barrier panel 162 is provided in the display part 160 in the manner that it is placed between the display panel 161 and the person viewing the display screen of the display panel 161 ("the viewer": the user of the mobile communication terminal 1 and the like).

The operational principle for the 3D display on the display part 160 having the above structure will be described hereafter with reference to FIGS. 3B to 3D, 4A, and 4B.

When the parallax barrier panel 162 is used for 3D display, the parallax between the right and left eyes is utilized. Therefore, a left-eye image as shown in FIG. 3B and a right-eye image as shown in FIG. 3C are prepared for the 3D display on the display part 160. The right-eye image and left-eye image ("the right and left images" hereafter) show the same display object but are shifted to the right or to the left according to the parallax.

The display panel 161 of the display part 160 displays pixels forming the left-eye image and pixels forming the right-eye image alternately at different positions shifted to the left or to the right. More specifically, the display panel 161 displays an image including pixels forming the right-eye image in odd columns and pixels forming the left-eye image in even columns.

In other words, a left-eye image and right-eye image are arranged (on the pixels) in every other column (line) and the lines for the left-eye image and the lines for the right-eye image are alternated. The arrangement pattern is not restricted to every other column. For example, multiple pixels can form one line. The unit of pixel array is not necessarily an integer.

The display panel 161 displays an image in which the left-eye image and right-eye image are arranged in stripes ("the 3D image" hereafter). Here, with the lines of pixels for the left-eye image reaching the left eye of the viewer and the lines of pixels for the right-eye image reaching the right eye of the viewer, the two parallax images as shown in FIGS. 3B and 3C are recognized by the corresponding eyes, respectively. Consequently, the images are combined in the brain of the user and visualized as a three-dimensional image.

The parallax barrier panel 162 serves to direct the lines of images in a 3D image to the corresponding eyes. As described above, having the same structure as the liquid crystal panel, the parallax barrier panel 162 can transmit or block the light generated upon image display on the display panel 161 by controlling the voltage applied to the electrodes corresponding to the pixels.

Figure 4A:
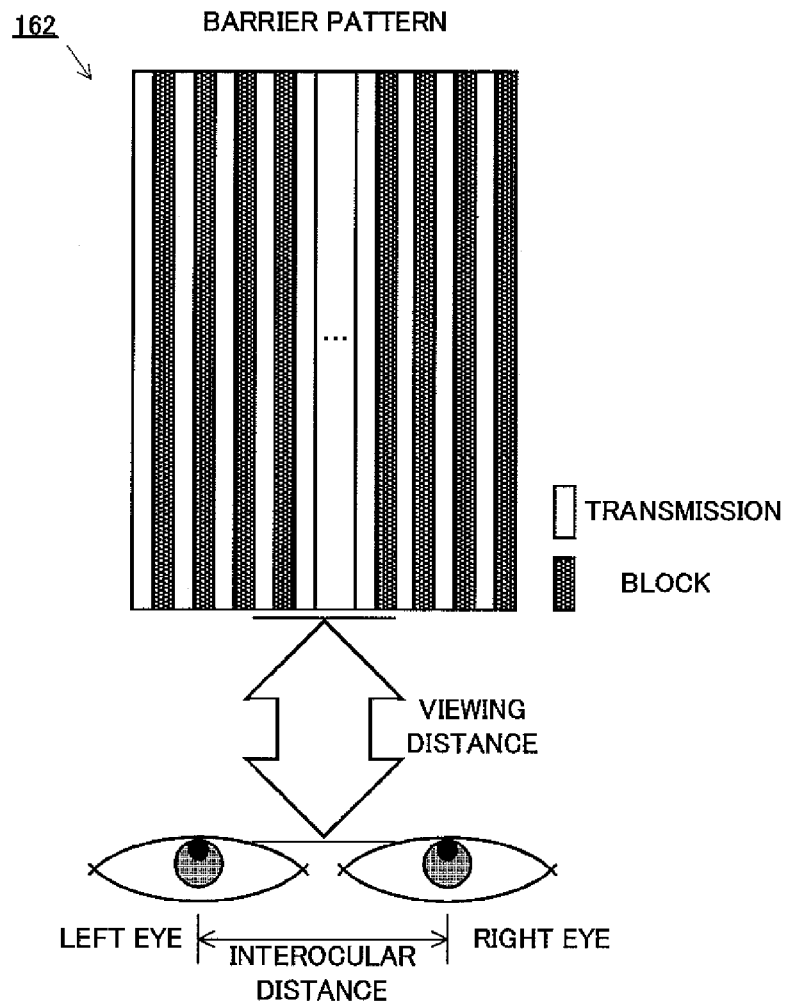
FIG. 4A is an illustration showing a barrier pattern for explaining the parallax barrier panel shown in FIG. 3A.
Figure 4B:
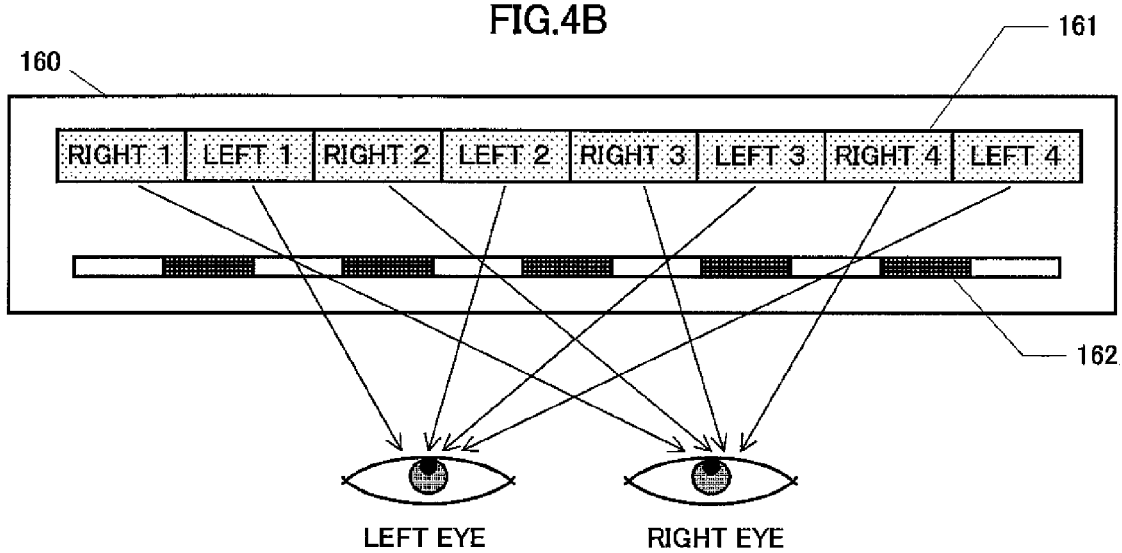
FIG. 4B is an illustration schematically showing the image transmission scheme on the barrier pattern for explaining the parallax barrier panel shown in FIG. 3A.

More specifically, a striped barrier pattern as shown in FIG. 4A is formed in accordance with the lines in the 3D image displayed on the display panel 161. Then, as shown in FIG. 4B, the left-eye pixels and right-eye pixels displayed on the display panel 161 are transmitted through the transmission columns of the barrier pattern formed on the parallax barrier panel 162 to reach the corresponding, left and right, eyes of the viewer, respectively.

Here, in order for the light transmitted through the transmission columns to reach the corresponding eye, the transmission direction should be controlled at each transmission column. In this case, the voltage applied to each transmission column can be controlled to change the orientation of liquid crystal molecules. The transmission direction leading to the corresponding eye varies depending on the distance between the viewer's eyes and display part 160 ("the viewing distance" hereafter) and the distance between the right and left eyes of the viewer ("interocular distance" hereafter).

In this embodiment, as described above, the casings 11 and 12 constituting the folding type mobile communication terminal 1 each carry the display part 160 (the display part 160A or 160B) and are capable of 3D display. In this case, the 3D display in the horizontally opened state as shown in FIG. 1C allows wide-screen images to be three-dimensionally displayed on a larger display screen.

Figure 5A:
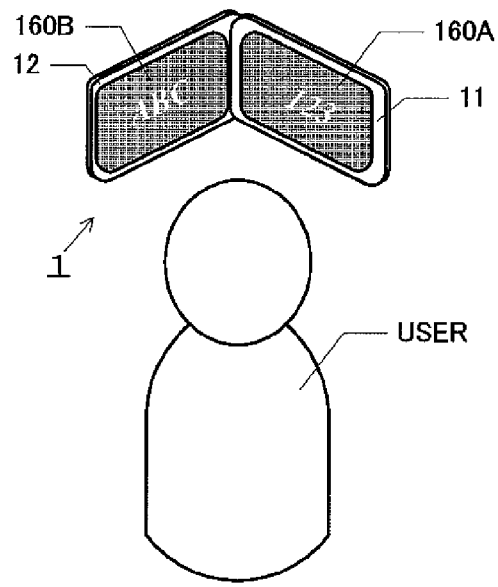
FIG. 5A is a schematic illustration showing the use of a horizontally opened device for explaining the viewing angle of the folding type mobile communication terminal shown in FIGS. 1A to 1C.

Here, the positional relationship between the mobile communication terminal 1 and viewer (user) is as shown in FIG. 5A. The mobile communication terminal 1 of this embodiment is of a folding type in which the angle between the casings 11 and 12 or the angle between the display screens of the display parts 160A and 160B ("the opening angle" hereafter) can be changed. The 3D display scheme used in this embodiment utilizes the parallax between the right and left eyes. Therefore, the opening angle largely affects the visibility of the 3D display.

Figure 5B:
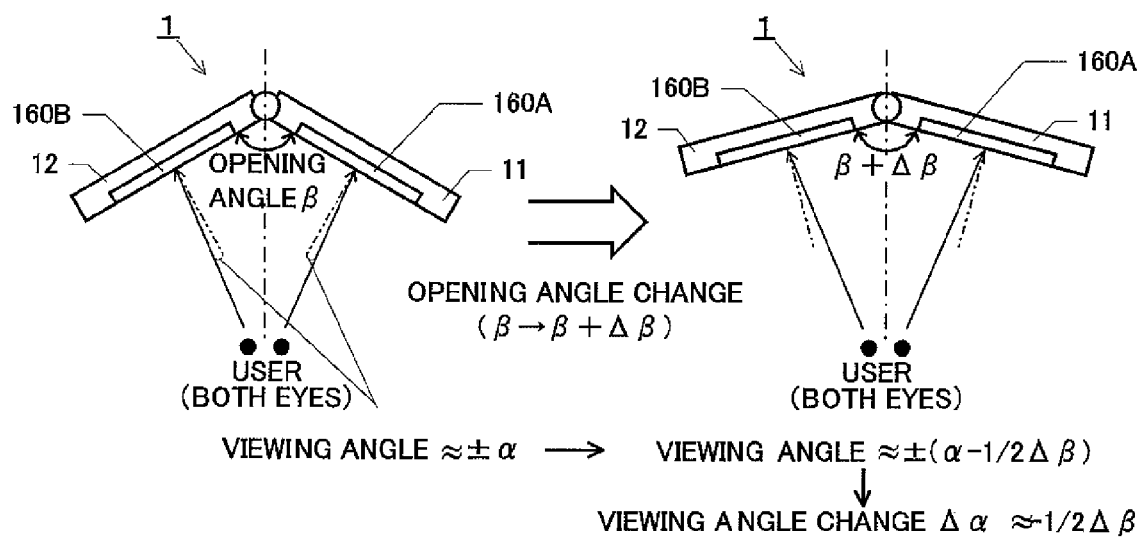
FIG. 5B is a schematic illustration showing the changes in the opening angle and viewing angle in the use shown in FIG. 5A for explaining the viewing angle of the folding type mobile communication terminal shown in FIGS. 1A to 1C.

For example, as shown in FIG. 5B, when the viewer (user) views the 3D display at a specific distance from the centers of the screens of the display parts 160A and 160B, the viewing angle of the user is changed as the opening angle of the mobile communication terminal 1 is altered.

The above change in the viewing angle can be calculated. As shown in FIG. 5B, assuming that the viewing angle is approximately $\pm\alpha$ when the opening angle is $\beta$, the viewing angle is approximately $\pm(\alpha-\frac{1}{2}\Delta\beta)$ as the opening angle is increased by $\Delta\beta(\beta+\Delta\beta)$. Here, the change in the viewing angle $\Delta\alpha$ is approximately $-\frac{1}{2}\Delta\beta$.

As described above, the viewing angle changes according to the opening angle in the 3D display of the folding type mobile communication terminal 1 in the horizontally opened state. The change in the viewing angle largely affects the visibility of the 3D display. Therefore, the viewing angle according to the opening angle of the mobile communication terminal 1 is an important viewing condition in addition to general conditions such as the viewing distance and interocular distance.

In this embodiment, multiple "condition parameters" presenting the above conditions as parameters are prepared for properly visualizing the 3D display. The "condition parameters" are stored in the storing part 140. Furthermore, in this embodiment, "control parameters" for forming a barrier pattern having a proper transmission direction are set for each of the prepared condition parameters and stored in association with the condition parameters stored in the storing part 140. In this embodiment, "a parameter table" as shown in FIG. 6 is stored in the storing part 140.

As shown in the figure, the condition parameters and control parameters are, associated with each other on the basis of the opening angle of the mobile communication terminal 1 in "the parameter table." Here, multiple combinations of the interocular distance and viewing distance are set for each opening angle. In addition, the viewing angle $\alpha$ is set for each combination. Then, the control parameters for obtaining a proper transmission direction in each combination are recorded. Examples of the control parameters include the control value for the display panel 161 that is set for proper 3D display in the display screen direction and the control value for each line of the parallax barrier panel 162 (such as the applied voltage) that leads to a proper transmission direction in the display.

More specifically, when the 3D image as shown in FIG. 3D is displayed on the display panel 161 and the barrier pattern formed on the parallax barrier panel 162 is used for 3D display, the 3D display is visualized under specific conditions. Therefore, the array of right and left images in the 3D image should be changed as the opening angle of the mobile communication terminal 1 is altered. The barrier pattern should accordingly be changed as the array of right and left images is changed. For this reason, the control value for the display panel 161 to obtain a proper array of right and left images and the control value for the parallax barrier panel 162 to accordingly form a proper barrier pattern are set as control parameters for each combination of the condition parameters that is set on the basis of the opening angle.

The control parameters for the display panel 161 are set according to the resolution of the display panel 161 in regard to the cycle and order of array of pixels of right and left images. The control parameters for the display panel 161 are set for a range of controllable resolutions and therefore discrete to a certain extent. When the vertical and horizontal pixel pitches are different between the portrait-oriented screen display and the landscape-oriented screen display, the control parameters for the display panel 161 have different control values depending on the display screen orientation.

The interocular distance as a condition parameter is a fixed value for the same viewer. A default value can be set for efficient processing. For example, a combination of an average interocular distance and viewing distance is assigned as the default values for the first 3D display at the mobile communication terminal 1. The parameters used at the previous 3D display are assigned as the default values for the second and subsequent displays. Therefore, the default values should be identified as indicated by the hatched lines in FIG. 6.

In this embodiment, only the parameter table that is referred to for 3D display using the display parts 160A and 160B of the horizontally opened mobile communication terminal 1 as shown in FIG. 1C is prepared in the storing part 140. A parameter table that is referred to for 3D display in the vertically opened state (FIG. 1B) may additionally be prepared.

The configuration of the mobile communication terminal 1 will further be explained with reference to FIG. 2 again.

The state detection part 170 is comprised of a group of sensors for sensing the state of the mobile communication terminal 1. In this embodiment, the state detection part 170 is comprised of a sensor for sensing the orientation of the mobile communication terminal 1 (such as a geomagnetic sensor, angular velocity sensor, and acceleration sensor) and a sensor for detecting the opening angle of the mobile communication terminal 1 (such as a rotary encoder). The state detection part 170 supplies signals presenting the detection results to the controller 110.

The mobile communication terminal 1 of this embodiment has the above described core structure. This is the structure essential for realizing the present invention. Other structures necessary for realizing the major and additional functions of the mobile communication terminal are provided as appropriate.

Operation of the mobile communication terminal 1 having the above structure will be described hereafter. With the display on the display part 160 being controlled in the vertically opened state or in the horizontally opened state as shown in FIGS. 1A to 1C, the mobile communication terminal 1 of this embodiment provides the image display according to the opening direction. The display part 160 of this embodiment is capable of 3D display. The parallax barrier panel 162 is controlled for properly visualizing the 3D display while the image display is controlled according to the opening direction.

Figure 7:
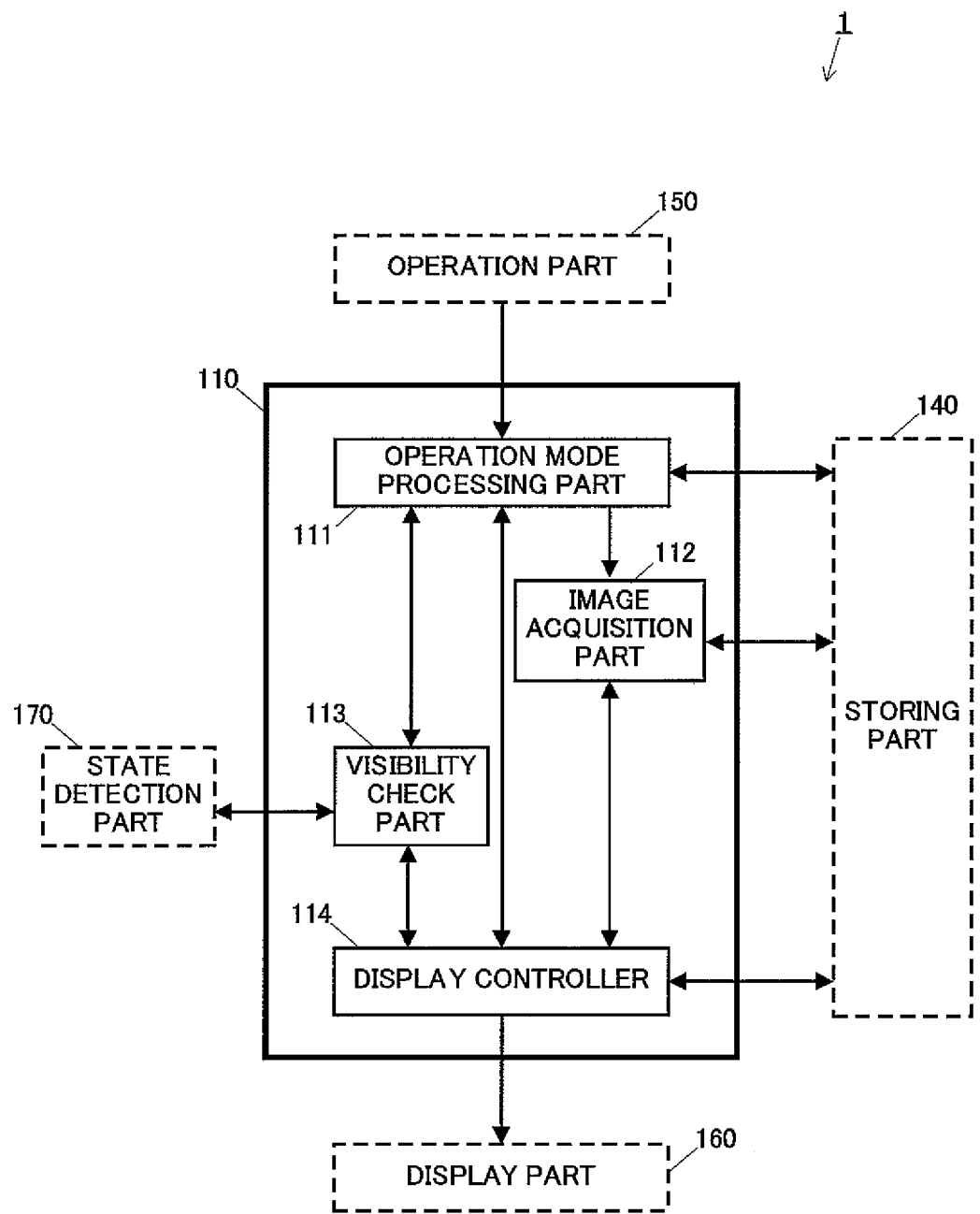
FIG. 7 is an illustration showing a functional configuration realized by the controller shown in FIG. 2.

For the above operation, the controller 110 executes the operation programs stored in the storing part 140 to realize the functions shown in FIG. 7. As shown in the figure, the controller 110 functions as an operation mode processing part 111, an image acquisition part 112, a visibility check part 113, and a display controller 114.

The operation mode processing part 111 specifies the operation mode of the mobile communication terminal 1 based on signals entered by the user of the mobile communication terminal 1 through the operation part 150 and provides instructions to the function blocks according to the specified operation mode.

The image acquisition part 112 acquires image data constituting a display screen for the screen display on the display part 160 of the mobile communication terminal 1. In this embodiment, the image acquisition part 112 acquires image data of images created for the 3D display and image data used for the general display ("the 2D display" hereafter). The image data are stored for example in the storing part 140. The image acquisition part 112 acquires image data necessary for the screen display from the storing part 140 as needed.

The visibility check part 113 determines whether the mobile communication terminal 1 is opened horizontally or vertically based on input signals from the state detection part 170. More specifically, it is determined whether the mobile communication terminal 1 is opened vertically as shown in FIG. 1B or horizontally as shown in FIG. 1C based on the detection signals from the state detection part 170 that indicate the orientation of the mobile communication terminal 1 in relation to the gravity. The visibility check part 113 calculates the opening angle of the mobile communication terminal 1 based on the detection signals from the state detection part 170 as needed.

The display controller 114 selects parameters stored in the storing part 140 based on the operation mode specified by the operation mode processing part 111, attributes of the image data acquired by the image acquisition part 112, and opening direction and angle of the display part 160 determined by the visibility check part 113, and controls the display operation of the display part 160 using the selected parameters. Here, the display controller 114 controls the display according to the operation setting for 3D display operation. The operation setting is stored in the storing part 140 for example as an "operation setting table" as shown in FIG. 8.

Here, as shown in FIG. 8, the operation setting includes items such as "display mode," "display in the closed state," "display during the vertical/horizontal switching," and "display during the coupling state change."

The "display mode" is set for specifying whether or not the display part 160 provides the 3D display. For providing the 3D display as default, the "display mode" is set to enable an option "3D," whereby the 3D display mode is turned on. On the other hand, the "display mode" is set to enable an option "2D" for not providing the 3D display, whereby the 3D display mode is turned off.

The "display in the closed state" is set for specifying whether or not the display part 160 provides the screen display while the mobile communication terminal 1 is closed. When the mobile communication terminal 1 is of a folding type, it is generally set for "NO" for specifying no display.

The "display during the vertical/horizontal switching" is set for specifying whether or not the display part 160 provides the screen display while the mobile communication terminal 1 is switched from the vertically opened state to the horizontally opened state or from the horizontally opened state to the vertically opened state (during the vertical/horizontal switching).

Here, the vertical/horizontal switching means that the user of the mobile communication terminal 1 rotates the mobile communication terminal 1 by 90 degrees, during which the display screen direction is changed from the portrait-oriented to landscape-oriented or from the landscape-oriented to portrait-oriented. Here, the display screen is tilted. As described above, the parallax barrier panel 162 provides a barrier pattern during the 3D display on the display part 160. While the display screen is tilted, the image displayed on the display panel 161 is also tilted and the barrier pattern should be matched with it.

In such a case, when the display screen is oriented vertically or horizontally, a simply striped barrier pattern can be used. During the vertical/horizontal switching, the display screen direction is continuously changed. In such a case, the processing becomes complex and the display control cannot catch up with the angular change and the 3D display quality may be lowered. Furthermore, it is difficult to create a clear tilted barrier pattern itself. Therefore, the "display during the vertical/horizontal switching" includes an option for the 2D display instead of the 3D display ("2D") and an option for no display (NO) during the vertical/horizontal switching in which the display screen is tilted.

The "display during the coupling state change" is set for specifying whether the display is provided while the coupling state of the casings of the mobile communication terminal 1 is changed, namely the opening angle is changed. Here, it is set for "YES" for providing the display while the coupling state (opening angle) is changed or for "NO" for providing no display while the coupling state (opening angle) is changed. When "YES" is enabled, the display is set for "2D" or "3D."

The above items are set by the user of the mobile communication terminal 1 through the operation part 150.

Procedures executed by the functional configuration shown in FIG. 7 will be described hereafter. Here, "the display control procedure" executed for the screen display of the mobile communication terminal 1 having the above described structure will be described with reference to the flowchart shown in FIG. 9. This "display control procedure" starts for the display operation on the display part 160 (for example, the mobile communication terminal 1 is powered on or restored from the sleep mode).

When the procedure starts, the visibility check part 113 controls the state detection part 170 to detect the opening angle of the mobile communication terminal 1 (Step S101) and determines whether or not the mobile communication terminal 1 is "in the opened state" based on the detected opening angle (Step S102).

When the mobile communication terminal 1 is "in the closed state" (Step S102: No), the visibility check part 113 informs the display controller 114 of the state accordingly. In such a case, the display controller 114 makes reference to the operation setting table in the storing part 140 and controls the display part 160 to provide the display according to the operation setting for the display in the closed state (2D or no display) (Step S103). Here, "the closed state" is assumed not only when the opening angle is 0° but also when the opening angle is so small that it is difficult to view the display screen of the display part 160.

In other words, when it is determined to be impossible or difficult to view the display on the display part 160 based on the opening angle, the display controller 114 provides the 2D display or no display instead of the 3D display. In such a case, the operation setting table (FIG. 8) in the storing part 140 may have more itemized settings for "the display in the closed state." For example, the 2D display may be provided at the opening angles that make it difficult to view the display (poor visibility) (for example, not larger 30° and larger than 15°) and the display may be cut off at the opening angles that make it impossible to view the display (no visibility) (for example, 15° or smaller).

On the other hand, when the mobile communication terminal 1 is "in the opened state" (Step S102: Yes), the visibility check part 113 informs the operation mode processing part 111 of the state accordingly. In such a case, the operation mode processing part 111 determines whether or not the display mode is "3D" by making reference to the operation setting table in the storing part 140 (Step S104). If the display mode is "2D" (Step S104: No), the display controller 114 controls for the 2D display (Step S103).

Figure 10:
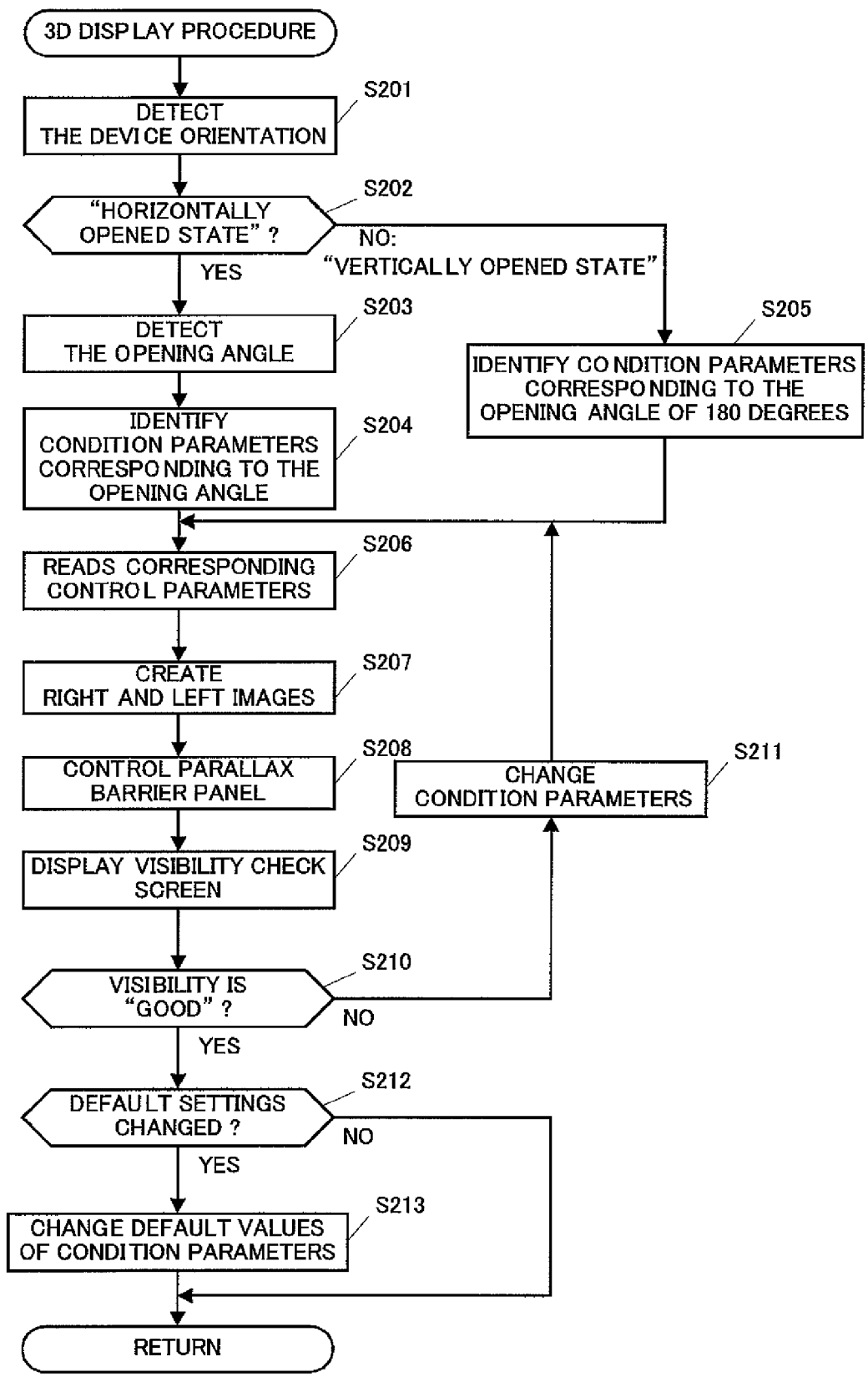
FIG. 10 is a flowchart for explaining "the 3D display procedure" executed in "the display control procedure" shown in FIG. 9.

On the other hand, if the display mode is "3D" (Step S104: Yes), the operation mode processing part 111 informs the image acquisition part 112, visibility check part 113, and display controller 114 of the mode accordingly and executes "the 3D display procedure" (Step S200). "The 3D display procedure" will be described hereafter with reference to the flowchart shown in FIG. 10.

When the procedure starts, the visibility check part 113 controls the state detection part 170 to detect the device orientation (Step S201). Then, the visibility check part 113 determines whether the mobile communication terminal 1 is opened horizontally or vertically based on the device orientation detected by the state detection part 170 (Step S202).

When the mobile communication terminal 1 is opened horizontally (Step S202: Yes), the visibility check part 113 controls the state detection part 170 to detect the opening angle (Step S203) and informs the display controller 114 of it.

The display controller 114 accesses the parameter table (FIG. 6) in the storing part 140 and identifies the condition parameters corresponding to the detected opening angle (Step S204). Here, it is assumed that the user is the same as the one for the previous 3D display. For the same user, the interocular distance and viewing distance are unchanged and the combination of their default values is identified.

On the other hand, when the mobile communication terminal 1 is opened vertically (Step S202: No), the opening angle in the vertical direction does not basically affect the visibility of the 3D display using the parallax. In such a case, the display controller 114 may borrow—the parameters stored in the parameter table for the horizontally opened state on the assumption that the user views the screen squarely. In such a case, the display controller 114 identifies the condition parameters corresponding to the opening angle of 180 degrees (the combination of default values) (Step S205). When the viewing distance is small for the lateral length of the screen, there may be differences from the parameters stored in the table for the horizontally opened state. In consideration of influence of such differences, corrections can be made by calculations.

After identifying the condition parameters, the display controller 114 reads the control parameters associated with the combination of identified condition parameters (Step S206), and creates the right and left images (Step S207) and controls the parallax barrier panel 162 (Step S208) based on the read control parameters for the 3D display. In such a case, the display controller 114 controls the parallax barrier panel 162 of both display parts 160A and 160B. More specifically, the read control parameters are used for the display control on both display parts 160A and 160B, whereby the display parts 160A and 160B cooperates for the 3D display (in an interlocking manner).

The display controller 114 displays on the display part 160 "a visibility check screen" for checking on the 3D display visibility with the user (Step S209). "The visibility check screen" contains a message for inquiring the user whether the 3D visibility is good or bad and choices that can be selected for entering the answer.

The user operates the operation part 150 to enter the answer to the question of whether the 3D display visibility is good or bad. Input signals corresponding to the user operation are supplied to the controller 110 from the operation part 150. In such a case, the display controller 114 is informed of the entered content via the operation mode processing part 111 and determines whether or not the visibility of the 3D display using the current parameters is good (Step S210).

When the visibility is not good (Step S210: No), the display controller 114 changes the condition parameters until good visibility is obtained (Step S211). Here, the above described "visibility check screen" may be designed to receive information on what is wrong with the 3D display from the user. In such a case, the display controller 114 changes the condition parameters based on the received information. Typically, the above described "visibility check screen" is designed to receive information on how bad it is such as "slightly bad" and "significantly bad." Then, the display controller 114 slightly changes the condition parameters when the information indicates "slightly bad." The display controller 114 largely changes the condition parameters when the information indicates "significantly bad." The interocular distance and viewing distance are temporarily changed in Step S211 and the changed interocular distance and viewing distance are used as the default values of the interocular distance and viewing distance in Step S213.

Figure 9:
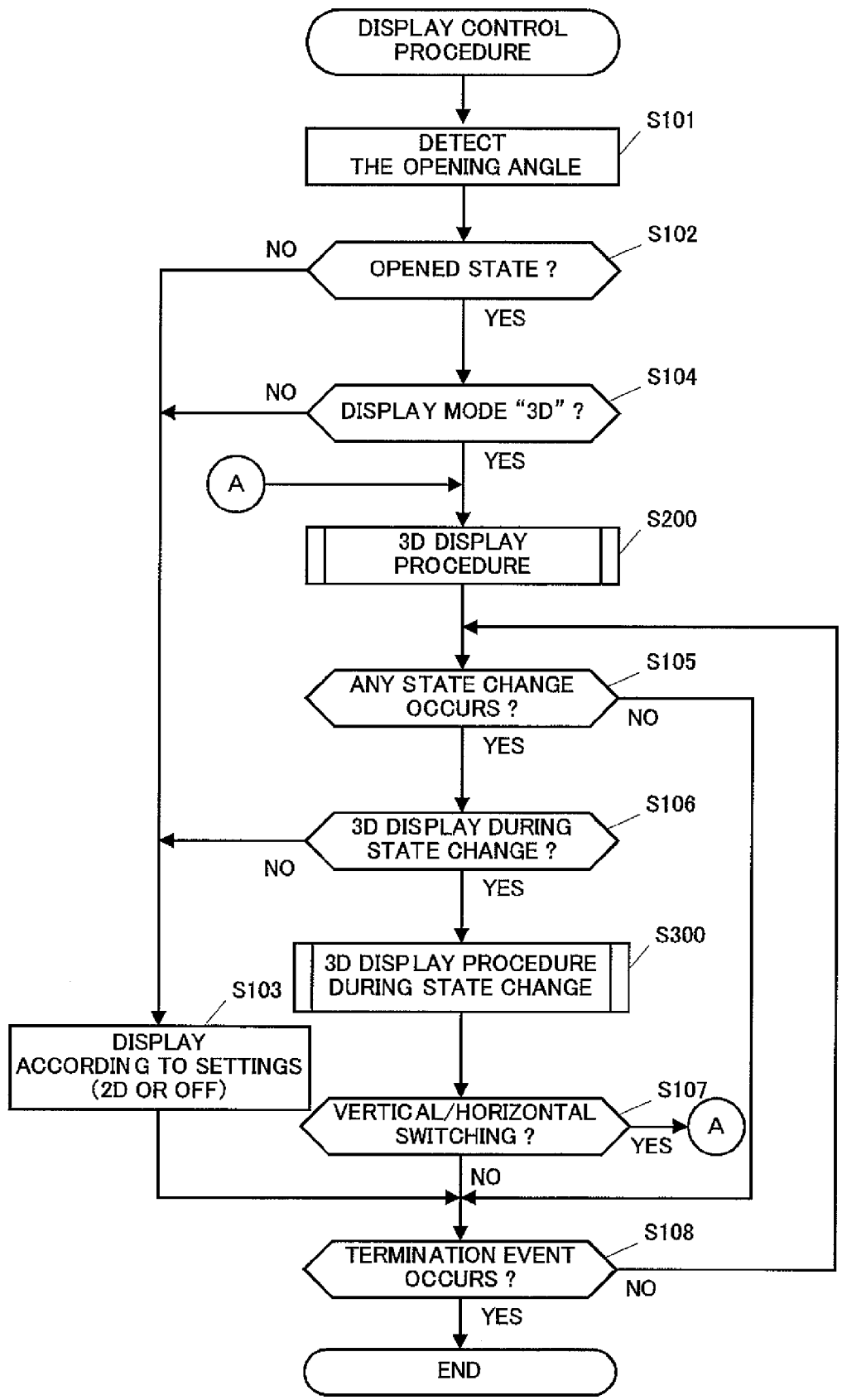
FIG. 9 is a flowchart for explaining "the display control procedure" according to an embodiment of the present invention.

When the visibility is good (Step S210: Yes), it is determined whether or not the condition parameters are changed in Step S211 (Step. S212). If the condition parameters are changed in Step S211 (Step S212: Yes), the default values in the parameter table are changed (Step S213) and the control returns to the flowchart of "the display control procedure" (FIG. 9). On the other hand, if the condition parameters are not changed in Step S211 (Step S212: No), the default values in the parameter table are not changed and the control returns to the flowchart of "the display control procedure" (FIG. 9).

As described above, at the start of display, the 3D display parameters are selected depending on the horizontally or vertically opened state and the operating parameters are adjusted based on the user evaluation on the actual display.

After the 3D display has started, the visibility check part 113 acquires the detection signals from the state detection part 170 as needed and determines whether or not the state of the mobile communication terminal 1 is changed until a specific termination event ends the procedure (Step S105, Step S108: No).

The state change includes the switching from the horizontally opened state to vertically opened state or from the vertically opened state to horizontally opened state of the mobile communication terminal 1 and any change in the opening angle. Therefore, when any change in the orientation or opening angle of the mobile communication terminal 1 is detected by the state detection part 170, the visibility check part 113 assumes that any state change has occurred.

When it is determined that any state change has occurred (Step S105: Yes), the visibility check part 113 informs the display controller 114 of the detail of the detected state change. In such a case, the display controller 114 makes reference to the operation setting table (FIG. 8) in the storing part 140 and determines whether or not the display during the state change, namely during the vertical/horizontal switching and/or the change in coupling state, is set for 3D (Step S106).

If the setting for the detected state change is not 3D (Step S106: No), the display controller 114 performs the display control according to the setting (2D display or no display) (Step S103).

On the other hand, if the setting for the detected state change is 3D (Step S106: Yes), a "3D display procedure during state change" is performed (Step S300). The "3D display procedure during state change" will be described with reference to the flowchart shown in FIG. 11. Here, if the setting for the detected state change is not 3D, the "3D display procedure" or "3D display procedure during state change" may be performed after the state change is completed.

When the procedure starts, the display controller 114 determines whether the detected change is any change in the opening angle or the vertical/horizontal switching based on the information from the visibility check part 113 (Step S301).

If the detected change is the vertical/horizontal switching (Step S301: No), the display controller 114 performs the display control according to the setting for "the display during the vertical/horizontal switching" in the operation setting table (FIG. 8) in the storing part 140 (2D or no display) (Step S302).

On the other hand, if the detected change is any change in the opening angle (Step S301: Yes), the visibility check part 113 determines whether or not the mobile communication terminal 1 is "in the opened state" based on the detected opening angle (Step S303). If the mobile communication terminal 1 is "in the closed state" (Step S303: No), the visibility check part 113 informs the display controller 114 of the state accordingly. In such a case, the display controller 114 makes reference to the operation setting table in the storing part 140 and controls the display part 160 to provide the display according to the display operation settings for the closed state (2D or no display) (Step S302).

When it is "in the opened state" (Step S303: Yes), the display controller 114 determines whether the mobile communication terminal 1 is currently opened horizontally or vertically based on the orientation of the mobile communication terminal 1 that is detected by the state detection part 170 (Step S304).

If it is opened horizontally (Step S304: Yes), the visibility check part 113 detects the change in the opening angle ("$\Delta\beta$") based on the detection signals from the state detection part 170 (Step S305) and calculates the change in the viewing angle ("$\Delta\alpha$") based on the detected change in the opening angle $\Delta\beta$ (Step S306).

In other words, as shown in FIG. 5B, assuming that the previous opening angle is $\beta$ and the corresponding viewing angle is approximately $\pm\alpha$, the viewing angle corresponding to the changed opening angle $\beta+\Delta\beta$ is approximately $\pm(\alpha-\frac{1}{2}\Delta\beta)$. The change in the viewing angle $\Delta\alpha$ in this case is approximately $-\frac{1}{2}\Delta\beta$. In this way, the change in the viewing angle can be calculated from the change in the opening angle.

The visibility check part 113 informs the display controller 114 of the calculated change in the viewing angle $\Delta\alpha$. The display controller 114 makes reference to the parameter table (FIG. 6) in the storing part 140 and reads the control parameters corresponding to the current viewing angle based on the information from the visibility check part 113 (Step S307).

As shown in FIG. 6, the parameter table contains the viewing angle as a condition parameter. Here, the viewing angle calculated in advance based on the interocular distance, viewing distance, and opening angle is recorded as multiple constants ("$\alpha n$" (n is an integer)). The display controller 114 makes reference to the parameter table, identifies a constant $\alpha n$ that is close to the current viewing angle based on the change in the viewing angle $\Delta\alpha$ calculated by the visibility check part 113, and reads the corresponding control parameters.

On the other hand, if any change in the opening angle is detected in the vertically opened state (Step S304: No), the control parameters corresponding to the opening angle of 180 degrees are read (Step S308) as in the above described "3D display procedure" (FIG. 10) because the change does not basically affect the 3D display using the parallax.

The display controller 114 creates the right and left images (Step S309) and controls the parallax barrier panel 162 (Step S310) based on the read control parameters for providing the 3D display proper at the viewing angle corresponding to the change in the opening angle.

The above described display control according to any state change in the mobile communication terminal 1 is repeated until the state change is completed (Step S311: No). In other words, when the opening angle is changed in the horizontally opened state, the 3D display is controlled using different control parameters depending on the changed opening angle.

Then, after the state change is completed (Step S311: Yes), the control is returned to the flowchart of "the display control procedure" (FIG. 9).

In "the display control procedure," if the state change in "the 3D display procedure during the state change" (FIG. 11) is "the vertical/horizontal switching" (Step S107: Yes), "the 3D display procedure" (FIG. 10) is executed to provide the 3D display according to the changed state (the horizontally or vertically opened state) (Step S200).

The above procedures are repeated until some termination event occurs (for example, the mobile communication terminal 1 is powered off or switched to the sleep mode) (Step S108: No). When the termination event occurs (Step S108: Yes), the procedure ends.

As described above, in this embodiment, when any change in the opening angle occurs during the 3D display in the horizontally opened state of a folding type mobile communication terminal of which both casings carry a display part capable of 3D display, the 3D display is controlled based on the change in the viewing angle corresponding to the change in the opening angle. Therefore, excellent visibility is maintained even if the opening angle is changed.

Here, some folding type mobile communication terminals are opened/closed in two directions. The folding type mobile communication terminal 1 of this embodiment may be of such a two-direction open/close type. More specifically, from the closed state shown in FIG. 12A, the mobile communication terminal 1 may be opened/closed about a longer side of the rectangular body as the rotation axis in the landscape orientation as shown in FIG. 12D. In such a case, the vertically opened display parts 160A and 160B are viewed in the landscape orientation. The display parts 160A and 160B are viewed one above the other in the view field of the user (the vertical opening (landscape)). This mode is used, for example, for viewing web screens and game screens.

FIG. 12E shows the mobile communication terminal 1 rotated by 90 degrees to the right or to the left from the opened state in the landscape orientation shown in FIG. 12D. Thus, the horizontally opened display parts 160A and 160B are viewed in the portrait orientation. The display parts 160A and 160B are viewed side by side in the view field of the user (the horizontal opening (portrait)). This mode is used, for example, in document display screens.

When the mobile communication terminal 1 is opened/closed in two directions, it is horizontally opened in the landscape orientation (the horizontal opening (landscape)) as shown in FIG. 12C or in the portrait orientation (the horizontal opening (portrait)) as shown in FIG. 12E. The parameter tables for the opening angles in each orientation can be prepared for the 3D display control according to the change in the opening angle in the horizontally opened state. Furthermore, if the parameters for the horizontally opened state in one orientation can be calculated from the parameters for the horizontally opened state in the other orientation based on the aspect ratio of the screen, only one parameter table for the horizontally opened state in either one orientation can be prepared.

The 3D display control described in this embodiment intends to maintain the visibility of the 3D display when the positional relationship between the two screens that can be horizontally expanded is changed, and is applicable to mobile communication terminals not only of the folding type but also of the sliding type.

A sliding type mobile communication terminal to which the present invention is applicable will be described hereafter with reference to FIGS. 13A to 13C. A mobile communication terminal 1' of this case is comprised of a casing 11 and a casing 12 that slides on the casing 11 in parallel. The casing 12 carries a display part 160B. In FIG. 13A, the casings 11 and 12 are superimposed (in the closed state). As the casing 12 is slid, the main surface of the casing 11 is exposed as shown in FIG. 13B.

The casing 11 of the mobile communication terminal 1' carries a display part 160A as of the folding type mobile communication terminal 1. The display part 160A is used as a touch pad input unit and for screen display together with the display part 160B as in the folding type mobile communication terminal 1.

Figure 14A:
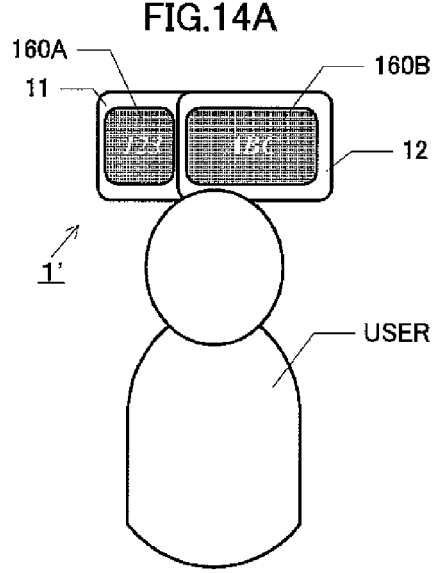
FIG. 14A is an illustration showing the use of a horizontally opened device for explaining the viewing angle of the sliding type mobile communication terminal shown in FIGS. 13A to 13C.

The display parts 160A and 160B of this case are both capable of 3D display as in the folding type mobile communication terminal 1. Furthermore, in the sliding type, the display parts 160A and 160B are expanded in the horizontal direction in "the horizontally opened state" as shown in FIG. 13C. The positional relationship between the mobile communication terminal 1' and the viewer (user) when it is used in the horizontally opened state is as shown in FIG. 14A.

In the folding type, any change in the opening angle affects the visibility of the 3D display in the horizontally opened state. In the sliding type, any change in the slide distance (rate) affects the visibility of the 3D display in the horizontally opened state. More specifically, as shown in FIG. 14B, the positional relationship in the horizontal direction between the display parts 160A and 160B changes according to the slide distance between the casings 11 and 12.

Figure 14B:
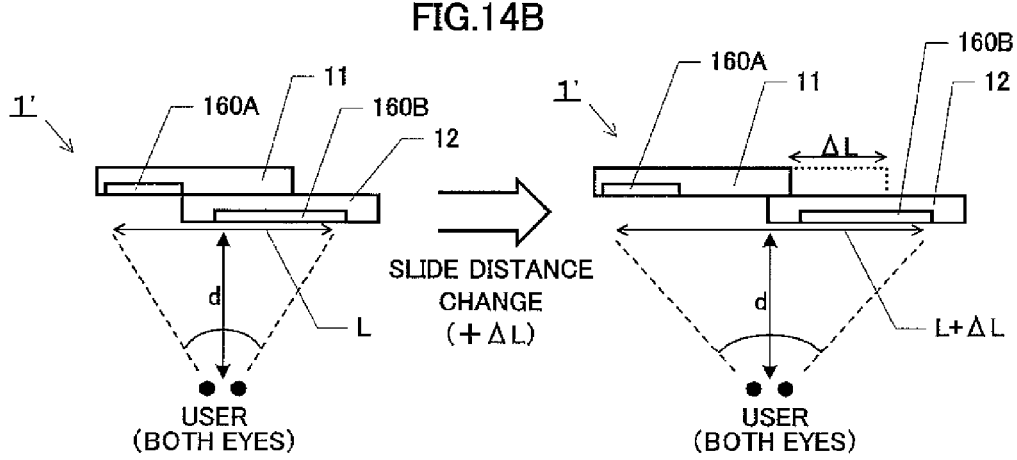
FIG. 14B is an illustration schematically showing the changes in the slide distance and viewing angle in the use shown in FIG. 14A for explaining the viewing angle of the sliding type mobile communication terminal shown in FIGS. 13A to 13C.

In this case, the viewing angle changes according to the distance L between the ends of the display parts 160A and 160B (the inter-screen distance L) as shown in FIG. 14B. The change in the viewing angle can be calculated as long as the distance d between the user and mobile communication terminal 1' is known. Therefore, the state detection part 170 of the sliding type mobile communication terminal 1' is composed of a sensor for detecting the slide distance (linear shifting distance) of the casing (such as a linear encode).

The distance d between the user and mobile communication terminal 1' can be a viewing distance set as a condition parameter in the parameter table as shown in FIG. 6 by way of example. The distance d may be detected by incorporating a sensor for detecting the distance (such as a photo sensor and ultrasonic sensor) in the state detection part 170.

The visibility check part 113 calculates the inter-screen distance L based on the detection signals from the state detection part 170, identifies the distance d from the viewing distance as a condition parameter specified in the parameter table, and calculates the viewing angle based on them.

Figure 14C:
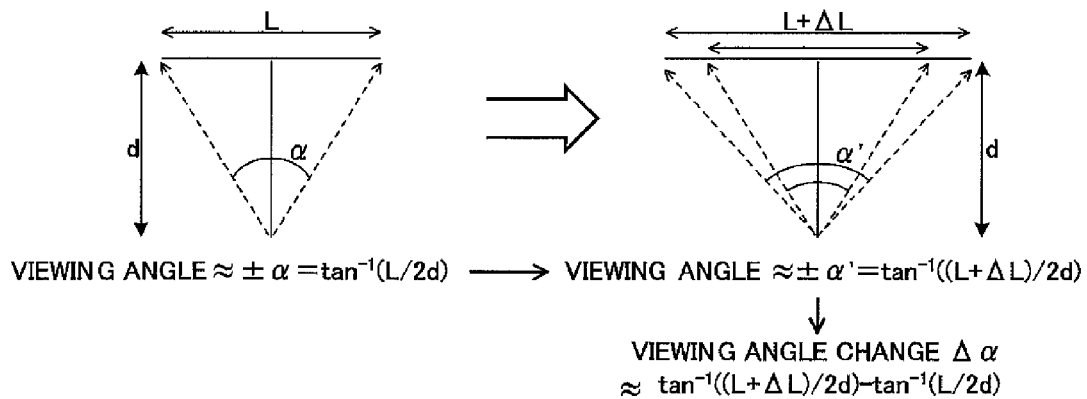
FIG. 14C is a schematic illustration showing the principle to obtain the change in the viewing angle based on the distance to the user and the slide distance for explaining the viewing angle of the sliding type mobile communication terminal shown in FIGS. 13A to 13C.

The approximate viewing angle $\pm\alpha$ can be calculated by $\tan^{-1}(L/2d)$ in which L is the inter-screen distance and d is the distance to the user as shown in FIG. 14C. In this case, when the casing is slid by $\Delta L$, the inter-screen distance becomes $L+\Delta L$. Then, the approximate viewing angle $\pm\alpha'$ can be calculated by $\tan^{-1}((L+\Delta L)/2d)$. The change in the viewing angle $\Delta\alpha$ is calculated by $\tan^{-1}((L+\Delta L)/2d) - \tan^{-1}(L/2d)$.

Figure 11:
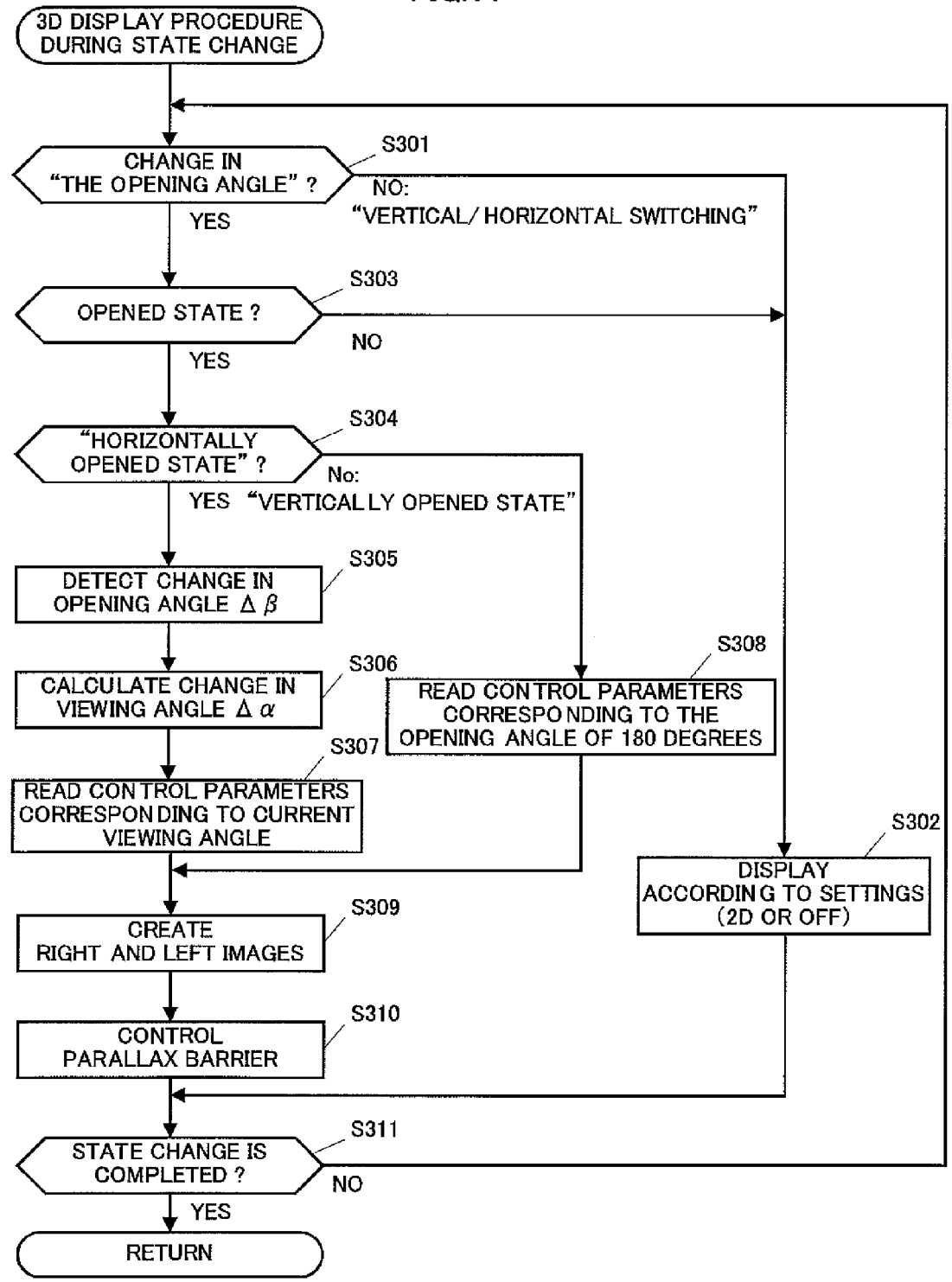
FIG. 11 is a flowchart for explaining "the 3D display procedure during state change" executed in "the display control procedure" shown in FIG. 9.

As described above, the change in the viewing angle can be calculated; therefore, the display can be controlled for proper 3D display according to the slide distance when the casing is slid in the horizontally opened state. To do so, as in the folding type, the resultant viewing angle is set in advance as a condition parameter in the parameter table and the inter-screen distance L is detected in place of detecting the opening angle in "the display control procedure" (FIG. 9), "3D display procedure" (FIG. 10), and "the 3D display procedure during state change" (FIG. 11).

It can be determined whether the sliding type mobile communication terminal 1' is "in the opened state" or "in the closed state" based on the slide distance. When the sliding type mobile communication terminal 1' is "in the closed state" as shown in FIG. 13A or "in the opened state" with a small slide distance, the display on the display part 160B can be viewed but it is impossible or difficult to view the display on the display part 160A. Therefore, when it is determined that the sliding type mobile communication terminal 1' is "in the closed state" or "in the opened state" with a small slide distance, the display controller 114 makes reference to the operation setting table in the storing part 140 and controls the display part 160 for providing the display according to the display operation setting for the closed state (2D or no display). More specifically, when it is determined to be impossible or difficult to view the display on the display part 160A or 160B based on the slide distance, the display part 160

(display part 160A and/or display part 160B) provides 2D or no display instead of the 3D display.

(Embodiment 2)

As described in the above Embodiment 1, the present invention allows the folding type mobile communication terminal 1 to control the 3D display according to any change in the opening angle. This embodiment shows an application of the display control according to any change in the opening angle.

The 3D display shows a displayed image as if it were three-dimensional. One of the 3D display parameters is "the projection distance (rate)." This parameter is used to control how much the image seems to be projected from the screen for the viewer.

Figure 15A:
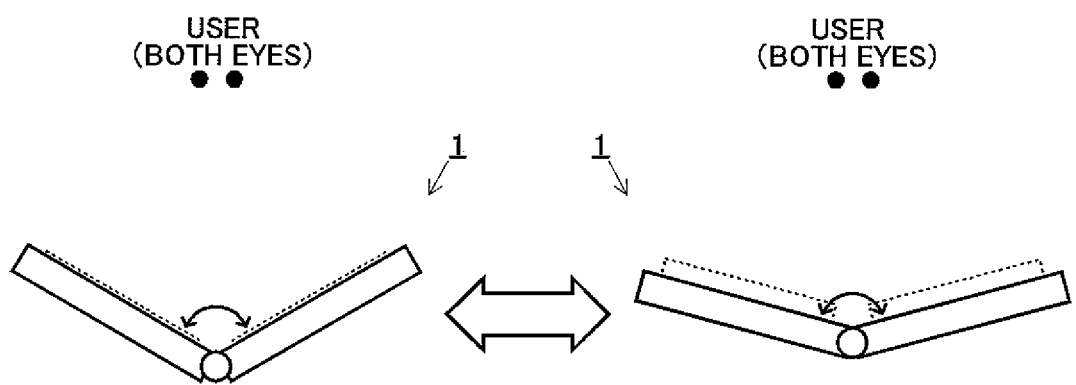
FIG. 15A is a schematic illustration showing the change in the projection distance of the 3D display according to the opening angle of the mobile communication terminal for explaining an operation according to Embodiment 2 of the present invention.

In the folding type mobile communication terminal 1, the projection distance parameter may be controlled according to the opening angle. For example, as shown in FIG. 15A, the projection distance is low when the opening angle is small and the projection distance may be raised as the opening angle is increased. In FIG. 15A, the dotted lines schematically indicate the apparent projection distances when the 3D displayed image is recognized as a three-dimensional image. Such control can provide display effect like pop-up picture books according to the opening/closing of the casings.

Figure 15B:
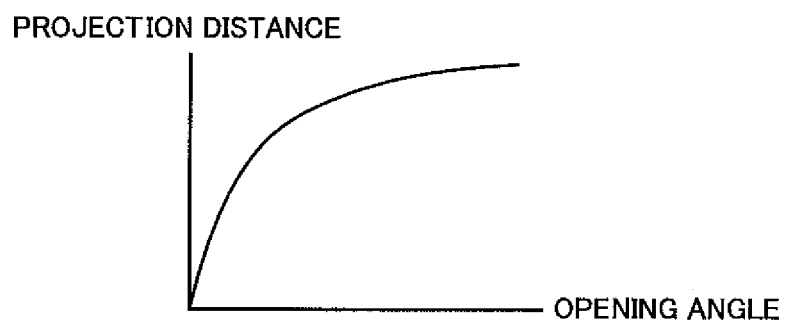
FIG. 15B is a graphical representation showing a relationship between the opening angle and projection distance in the case shown in FIG. 15A for explaining the operation according to Embodiment 2 of the present invention.

In such a case, the parameters are set for obtaining the relationship between the opening angle and projection distance as shown in FIG. 15B and the display may be controlled using the projection distance according to the opening angle detected by the state detection part 170.

Figure 16A:
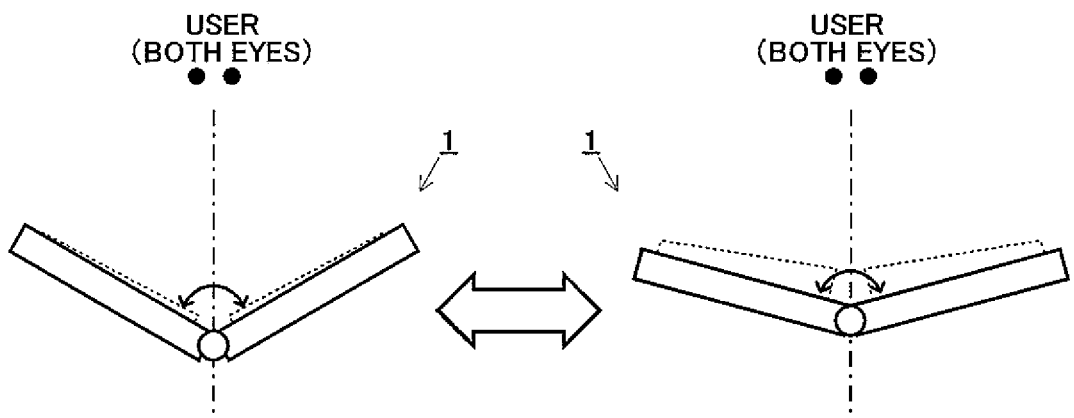
FIG. 16A is a schematic showing the 3D display with different projection distances depending on the position on the screen for explaining another operation according to Embodiment 2 of the present invention.
Figure 16B:
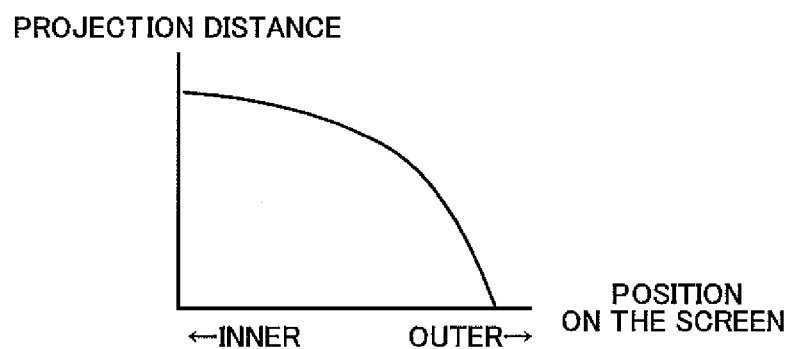
FIG. 16B is a graphical representation showing a relationship between the position on the screen and projection distance in the case shown in FIG. 16A for explaining another operation according to Embodiment 2 of the present invention.

In another application, for example, when two screens are used to display a three-dimensional image as shown in FIG. 16A, the projection distance can be varied depending on the position on the screen. In FIG. 16A, the dotted lines schematically indicate the apparent projection distances when the 3D displayed image is recognized as a three-dimensional image. In this embodiment, the overall projection distance is raised as the opening angle is increased with different increase/decrease rates of the projection distance between the center (the inner part of the screen) and periphery (the outer part of the screen) of the viewing angle as shown in FIG. 16B. In this case, the parameters are changed over the screens in an interlocking manner so that the projection distance is higher in the inner part of the screen than in the outer part of the screen, whereby the image looks more projected in the inner part like a pop-up picture book.

Figure 16C:
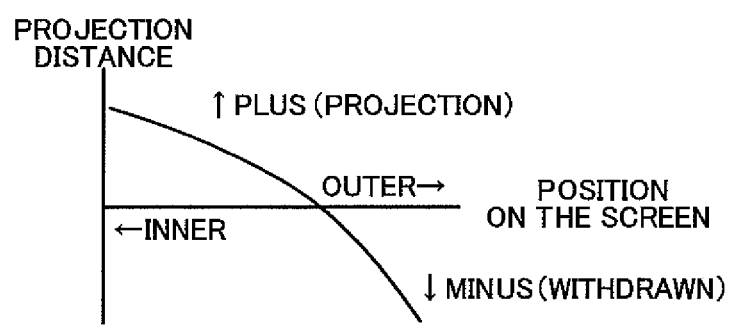
FIG. 16C is a graphical representation showing another relationship between the position on the screen and projection distance for explaining another operation according to Embodiment 2 of the present invention.

Furthermore, as shown in FIG. 16C, some projection distance parameters can be negative so that the three-dimensional effect of the 3D display is enhanced depending on the change in the opening angle.

Also in the sliding type mobile communication terminal 1', the projection distance parameter can be changed according to the slide distance for realizing diverse display effects as in Embodiment 1.

As described above, application of the present invention as in the above described embodiments allows the viewer to properly view the 3D display using two screens.

More specifically, a display device such as a mobile communication terminal having casings movably coupled in a folding or sliding manner wherein the casing coupling state is detected, the viewing angle is calculated from the detected coupling state, and the parameters are selected accordingly can provide proper 3D display even if the coupling state is changed. In such a case, the selected parameters are used to control the screens in an interlocking manner; therefore, there is no need of controlling them individually.

In the folding type, the viewing angle is calculated based on the angle between the opened/closed casings, providing proper 3D display regardless of changes in the opening angle. In such a case, it is determined whether the visibility is good or bad based on the angle between the casings. If the visibility cannot be good with that angle, the 2D display or no display is provided instead of the 3D display. In this way, the 2D display is provided for easier view where the 3D display is difficult to view. The display is cut off where the display cannot be viewed, thereby saving the electric power.

In the sliding type, the viewing angle is calculated based on the slide distance between the casings and the distance to the viewer; therefore, proper 3D display is provided regardless of changes in the slide distance. In such a case, when it is determined that the display on either one of the two screen cannot be viewed based on the slide distance, the 2D display or no display is provided on that screen instead of the 3D display, thereby saving the electric power.

It is difficult to control the 3D display during the switching between the horizontally and vertically opened states because the display screen is tilted. In such a case, the 2D display or no display is provided instead of the 3D display for easier view or electric power saving.

In the above cases, the parameters are changed while the two screens are horizontally expanded. Therefore, the 3D display using the parallax can be properly controlled. On the other hand, when they are vertically opened wherein the opening angle or slide distance does not basically affect the visibility of the 3D display, no control operations are performed, reducing the power consumption.

High speed processing is available by storing the condition parameters corresponding to the changes in the coupling state in the storing means. Furthermore, the visibility of the 3D display using the parallax is largely susceptible in the horizontally opened state. Therefore, only the parameters for the horizontally opened state are stored in the storing means and the parameters for the horizontally opened state can be borrowed during the vertically opened state for saving the capacity of the storing means.

Among the condition parameters, the interocular distance and viewing distance are generally unchanged for the same viewer. Therefore, on the assumption that the display device is viewed by the same viewer, specific default values can be used for the interocular distance and viewing distance. In such a case, the viewing angle can be calculated simply by detecting the opening angle. In other words, no sensors are required for measuring the interocular distance and viewing distance. The default values of the interocular distance and viewing distance are changed as appropriate in Step S211 when it is determined that the visibility is not good in Step S210.

Inclusion of the parameters defining the projection distance in the three-dimensional image display allows for diverse displays.

The above embodiments are given by way of example and the scope of applications of the present invention is not confined thereto. In other words, various applications are available and any embodiments are included in the scope of the present invention.

For example, the display device of present invention is realized as a mobile communication terminal in the above embodiments. The present invention is applicable to various display devices besides mobile communication terminals as long as they have a display means allowing three-dimensional view of images.

In addition to the display devices in which the structure of the present invention is installed in advance, the existing display devices can serve as the display device of the present invention by applying programs to them.

Such programs can be applied in any manner. For example, they can be stored in a CD-ROM or memory card for application or applied via communication media such as the Internet.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A display device including:
   a first casing having a first display screen; and
   a second casing movably coupled to the first casing and having a second display screen;
   wherein the display device comprises:
   a display unit providing a first three-dimensional image display on the first display screen and a second three-dimensional image display on the second display screen;
   a coupling state detection unit detecting the coupling state between the first casing and the second casing;
   a viewing angle calculation unit calculating a first viewing angle to the first three-dimensional image display and a second viewing angle to the second three-dimensional image display based on the coupling state detected by the coupling state detection unit, the second viewing angle being substantially the same as the first viewing angle; and
   a display control unit selecting first parameters used by the display unit for providing the first three-dimensional image display based on the first viewing angle calculated by the viewing angle calculation unit, and selecting second parameters used by the display unit for providing the second three-dimensional image display based on the second viewing angle calculated by the viewing angle calculation unit.

2. The display device according to claim 1 wherein the display unit controls the first display screen and the second display screen in an interlocking manner based on the first parameters and the second parameters selected by the display control unit for providing the first and second three-dimensional image displays.

3. The display device according to claim 1 wherein:
   the display device is a folding type display device in which the first casing and the second casing are coupled in an openable/closable manner;
   the coupling state detection unit at least detects the angle between the first casing and the second casing; and
   the viewing angle calculation unit calculates the first and second viewing angles based on the angle detected by the coupling state detection unit.

4. The display device according to claim 3, further comprising:
   a visibility check unit determining whether or not the visibility of the display that is displayed by the folding type display device based on the angle detected by the coupling state detection unit is good, wherein:
   the display unit provides a two-dimensional image display instead of the first three-dimensional image display using the first display screen and/or a two-dimensional image display instead of the second three-dimensional image display using the second display screen if the visibility check unit determines that the visibility is not good.

5. The display device according to claim 1 wherein:
   the display device is a sliding type display device in which the first casing and the second casing are coupled in a slidable manner;
   the coupling state detection unit at least detects an amount of sliding between the first casing and the second casing; and
   the viewing angle calculation unit calculates the first and second viewing angles based on the amount of sliding detected by the coupling state detection unit.

6. The display device according to claim 5, further comprising:
   a visibility check unit determining whether or not the visibility of the display that is displayed on the first or the second display screen based on the amount of sliding detected by the coupling state detection unit is good, wherein
   the display unit provides a two-dimensional image display instead of the first three-dimensional image display using the first display screen and/or a two-dimensional image display instead of the second three-dimensional image display using the second display screen if the visibility check unit determines that the visibility is not good.

7. The display device according to claim 1 further comprising:
   an expansion direction detection unit detecting the expansion direction of the first display screen and the second display screen, wherein:
   each of the first and second casings is configured to be expanded around each of multiple axes in each of multiple directions, and
   the display control unit selects the first parameters and/or the second parameters if the horizontal expansion of the first display screen and the second display screen is detected.

8. The display device according to claim 1 further comprising a parameter storing unit at least storing parameters regarding the matters detected by the coupling state detection unit as condition parameters.

9. The display device according to claim 8 wherein the parameter storing unit stores control parameters associated with the condition parameters and used by the display unit for display operation.

10. The display device according to claim 8 wherein:
    the parameter storing unit stores only the parameters used in the three-dimensional image display using the first display screen and the second display screen expanded in the horizontal direction; and
    the display control unit selects the parameters for viewing the three-dimensional image display squarely to the first or the second display screen among the parameters stored in the parameter storing unit and used for the three-dimensional image display using the first display screen and the second display screen expanded in the horizontal direction when the vertical expansion of the first display screen and the second display screen is detected.

11. The display device according to claim 8 wherein the display control unit identifies the condition parameters based on the coupling state detected by the coupling state detection unit and the first and second viewing angles calculated by the viewing angle calculation unit, and selects the control parameters specified by the identified condition parameters.

12. The display device according to claim 1 wherein the display unit does not provide the first three-dimensional image display using the first display screen and/or the second three-dimensional image display using the second display screen if display screen directions of the first and second display screens are tilted due to an incomplete change from a portrait-orientation to a landscape-orientation or from the landscape-orientation to the portrait-orientation.

13. The display device according to claim 1 wherein
the first parameters include parameters defining the projection distance in the first three-dimensional image display, and
the second parameters include parameters defining the projection distance in the second three-dimensional image display.

14. A display device including:
a first casing having a first display screen; and
a second casing movably coupled to the first casing and having a second display screen;
wherein the display device comprises:
a display unit providing a first three-dimensional image display on the first display screen and a second three-dimensional image display on the second display screen;
a coupling state detection unit detecting the coupling state between the first casing and the second casing; and
a display control unit controlling the first three-dimensional image display and the second three-dimensional image display such that the projection distances in the first and second three-dimensional image displays vary according to a change in the coupling state detected by the coupling state detection unit while the coupling state is an opened state.

15. The display device according to claim 14 wherein the display control unit controls the first three-dimensional image display such that the projection distance in the first three-dimensional image display is based on the coupling state detected by the coupling state detection unit and a display position in the first display screen and the second three-dimensional image display such that the projection distance in the second three-dimensional image display is based on the coupling state detected by the coupling state detection unit and a display position in the second display screen.

16. The display device according to claim 14, further comprising:
a viewing angle calculation unit calculating a first viewing angle to the first three-dimensional image display and a second viewing angle to the second three-dimensional image display based on the coupling state detected by the coupling state detection unit, the second viewing angle being substantially the same as the first viewing angle, wherein
the display unit provides the first three-dimensional image display on the first display screen and the second three-dimensional image display on the second display screen based on the coupling state detected by the coupling state detection unit and the first and second viewing angles calculated by the viewing angle calculation unit.

17. A non-transitory recording medium storing a program which when executed by a processor of a computer controls a display device including:
a first casing having a first display screen; and
a second casing movably coupled to the first casing and having a second display screen to realize the following functions:
providing a first three-dimensional image display on the first display screen and a second three-dimensional image display on the second display screen;
detecting the coupling state between the first casing and the second casing;
calculating a first viewing angle to the first three-dimensional image display and a second viewing angle to the second three-dimensional image display based on the detected coupling state, the second viewing angle being substantially the same as the first viewing angle; and
selecting first parameters used for providing the first three-dimensional image display based on the first calculated viewing angle, and selecting second parameters used for providing the second three-dimensional image display based on the second calculated viewing angle.

18. A non-transitory recording medium storing a program which when executed by a processor of a computer controls a display device including:
a first casing having a first display screen; and
a second casing movably coupled to the first casing and having a second display screen to realize the following functions:
providing a first three-dimensional image display on the first display screen and a second three-dimensional image display on the second display screen;
detecting the coupling state between the first casing and the second casing; and
controlling the first three-dimensional image display and the second three-dimensional image display such that the projection distances in the first and second three-dimensional image displays vary according to a change in the detected coupling state while the coupling state is in an opened state.

19. The display device according to claim 1, further comprising:
a first parallax barrier used for providing the first three-dimensional image display; and
a second parallax barrier used for providing the second three-dimensional image display,
wherein the display unit provides the first three-dimensional image display by controlling the first parallax barrier based on the first parameters selected by the display control unit, and displays the second three-dimensional image display by controlling the second parallax barrier based on the second parameters selected by the display control unit.

20. The non-transitory recording medium according to claim 17, storing a program which when executed by a processor of a computer controls a display device further including:
a first parallax barrier for providing the first three-dimensional image display; and
a second parallax barrier for providing the second three-dimensional image display,
wherein the program further executes the computer for:
displaying the first three-dimensional image display by controlling the first parallax barrier based on the first parameters selected; and
displaying the second three-dimensional image display by controlling the second parallax barrier based on the second parameters selected.

* * * * *